US009593280B2

(12) United States Patent
Kuriyama et al.

(10) Patent No.: US 9,593,280 B2
(45) Date of Patent: Mar. 14, 2017

(54) LIQUID CRYSTAL DISPLAY DEVICE

(71) Applicant: DIC Corporation, Tokyo (JP)

(72) Inventors: Takeshi Kuriyama, Kita-adachi-gun (JP); Jouji Kawamura, Kita-adachi-gun (JP); Seiji Funakura, Kamisu (JP); Isao Oshiumi, Tokyo (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 127 days.

(21) Appl. No.: 14/654,308

(22) PCT Filed: Jun. 18, 2013

(86) PCT No.: PCT/JP2013/066686
§ 371 (c)(1),
(2) Date: Jun. 19, 2015

(87) PCT Pub. No.: WO2014/203325
PCT Pub. Date: Dec. 24, 2014

(65) Prior Publication Data
US 2015/0344778 A1 Dec. 3, 2015

(51) Int. Cl.
*C09K 19/20* (2006.01)
*C09K 19/30* (2006.01)
(Continued)

(52) U.S. Cl.
CPC .......... *C09K 19/3066* (2013.01); *C09K 19/20* (2013.01); *C09K 19/44* (2013.01);
(Continued)

(58) Field of Classification Search
CPC .... C09K 19/20; C09K 19/3066; C09K 19/44; C09K 19/56; C09K 2019/0448;
(Continued)

(56) References Cited

U.S. PATENT DOCUMENTS 5,378,274 A   1/1995   Yokoyama et al.
5,831,701 A   11/1998  Matsuyama et al.
(Continued)

FOREIGN PATENT DOCUMENTS

CN   101790573 A   7/2010
CN   103069316 A   4/2013
(Continued)

OTHER PUBLICATIONS

International Search Report dated Aug. 20, 2013, issued in corresponding application No. PCT/JP2013/066686 (2 pages).
International Search Report dated Feb. 25, 2014, issued in International Application No. PCT/JP2014/084439, counterpart of U.S. Appl. No. 14/420,610.

*Primary Examiner* — Shean C Wu
(74) *Attorney, Agent, or Firm* — Westerman, Hattori, Daniels & Adrian, LLP

(57) ABSTRACT

There is provided a liquid crystal display device that may limit a reduction in the voltage holding ratio (VHR) of a liquid crystal layer and an increase in the ion density (ID) in the liquid crystal layer and thereby address issues of faulty display such as white missing pixels, alignment inconsistencies, and burn-in. The liquid crystal display device according to the present invention, which may limit a reduction in the voltage holding ratio (VHR) of a liquid crystal layer and an increase in the ion density (ID) in the liquid crystal layer and thereby reduce the risk of faulty display such as burn-in, can be suitably used, in particular, as an IPS-mode or FFS-mode liquid crystal display device for active-matrix driving and may also be used as a liquid crystal display device for liquid crystal display televisions, monitors, mobile phones, smart phones, or the like.

11 Claims, 1 Drawing Sheet

(51) Int. Cl.
*C09K 19/54* (2006.01)
*G02F 1/1335* (2006.01)
*G02F 1/137* (2006.01)
*C09K 19/56* (2006.01)
*C09K 19/44* (2006.01)
*C09K 19/04* (2006.01)
*C09K 19/12* (2006.01)

(52) U.S. Cl.
CPC .............. *C09K 19/56* (2013.01); *G02F 1/137* (2013.01); *G02F 1/133512* (2013.01); *G02F 1/133514* (2013.01); *C09K 19/54* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3025* (2013.01); *C09K 2019/3075* (2013.01); *C09K 2019/548* (2013.01)

(58) Field of Classification Search
CPC ...... C09K 2019/0466; C09K 2019/122; C09K 2019/123; C09K 2019/3004; C09K 2019/301; C09K 2019/3016; C09K 19/54; C09K 2019/3025; C09K 2019/3019; C09K 2019/548; C09K 2019/124; G02F 1/137; G02F 1/133512; G02F 1/133514
See application file for complete search history.

(56) References Cited

U.S. PATENT DOCUMENTS

| | | | |
|---|---|---|---|
| 7,936,428 B2* | 5/2011 | Takahashi | G02F 1/134363 257/59 |
| 2004/0017533 A1 | 1/2004 | Sumino | |
| 2005/0190316 A1* | 9/2005 | Takahashi | G02F 1/134363 349/44 |
| 2009/0162576 A1 | 6/2009 | Lee et al. | |
| 2010/0309423 A1 | 12/2010 | Bernatz et al. | |
| 2015/0232758 A1 | 8/2015 | Kuriyama et al. | |

FOREIGN PATENT DOCUMENTS

| | | |
|---|---|---|
| EP | 2 796 922 A1 | 10/2014 |
| JP | 09-043589 A | 2/1997 |
| JP | 2000-019321 A | 1/2000 |
| JP | 2000-192040 A | 7/2000 |
| JP | 2003-295169 A | 10/2003 |
| JP | 2009-109542 A | 5/2009 |
| JP | 2010-537256 A | 12/2010 |
| JP | 2011-118139 A | 6/2011 |
| JP | 2012-032697 A | 2/2012 |
| JP | 2012-068630 A | 4/2012 |
| JP | 2013-096944 A | 5/2013 |
| JP | 5273494 B1 | 8/2013 |
| JP | 5321932 B1 | 10/2013 |
| KR | 10-0286582 B1 | 1/2001 |
| KR | 10-2009-0068709 A | 6/2009 |

* cited by examiner

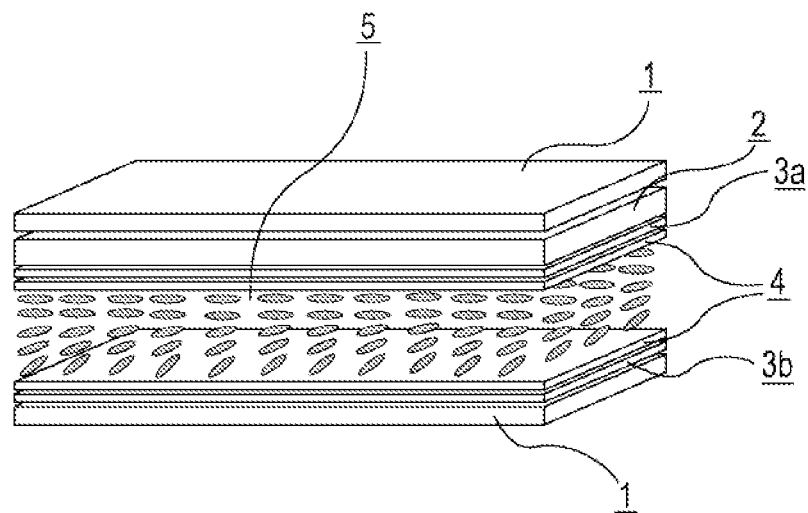
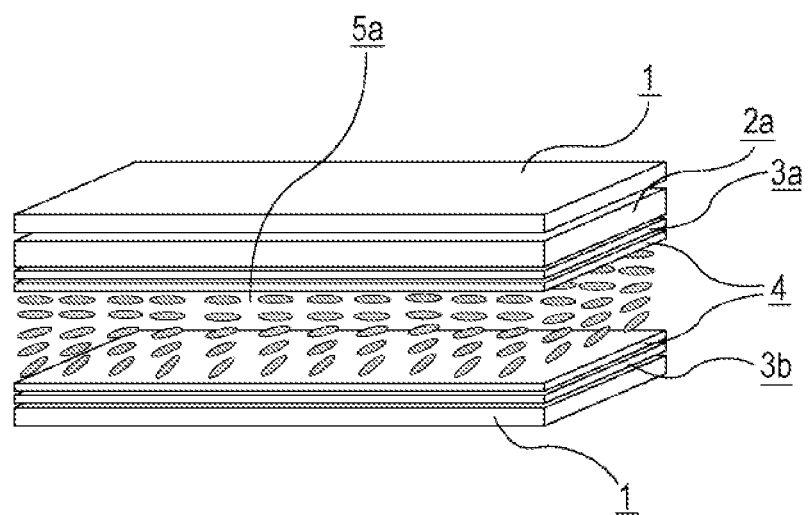

LIQUID CRYSTAL DISPLAY DEVICE

TECHNICAL FIELD

The present invention relates to a liquid crystal display device.

BACKGROUND ART

Liquid crystal display devices have been used in clocks, electronic calculators, various home appliances, measuring equipment, panels for automobiles, word processors, electronic personal organizers, printers, computers, televisions, and the like. Common examples of liquid crystal display methods include a TN (twisted nematic) type, a STN (super-twisted nematic) type, a DS (dynamic light scattering) type, a GH (guest-host) type, an IPS (in-plane switching) type, an OCB (optically compensated birefringence) type, an ECB (electrically controlled birefringence) type, a VA (vertical alignment) type, a CSH (color super-homeotropic) type, and a FLC (ferroelectric liquid crystal). There has been a shift in the driving method used from a conventional static driving to a multiplex driving, which has been commonly employed. Simple-matrix liquid crystal displays and, recently, active-matrix (AM) liquid crystal displays, which are driven using a TFT (thin-film transistor), a TFD (thin-film diode), or the like, have been widely employed.

As illustrated in FIG. 1, a common liquid crystal display device includes two substrates (1) each including an alignment film (4) disposed thereon; a transparent electrode layer (3a) serving as a common electrode and a color filter layer (2), which are interposed between one of the alignment film and the corresponding substrate; and a pixel electrode layer (3b) interposed between the other alignment film and the corresponding substrate. The two substrates are arranged such that the alignment films face each other, and a liquid crystal layer (5) is held therebetween.

The color filter layer includes a color filter constituted by a black matrix, a red-colored layer (R), a green-colored layer (G), a blue-colored layer (B), and, as needed, a yellow-colored layer (Y).

The amount of impurities contained in a liquid crystal material constituting the liquid crystal layer is strictly controlled because any impurities remaining in the liquid crystal material would greatly affect the electrical characteristics of the display apparatus. It is known that the material constituting the alignment film also affects the electrical characteristics of the liquid crystal layer because any impurities remaining in the alignment film, which is in direct contact with the liquid crystal layer, would migrate into the liquid crystal layer. Thus, the characteristics of the liquid crystal display device due to impurities contained in a material of the alignment film is currently being studied.

As well as a material of the alignment film, a material of the color filter layer, such as an organic pigment, is also considered to affect the liquid crystal layer due to impurities contained in the material of the color filter layer. The direct effect of a material of the color filter layer on the liquid crystal layer has been considered to be very small compared with the effect of a material of the alignment film since the alignment film and the transparent electrode are interposed between the color filter layer and the liquid crystal layer. However, the thickness of the alignment film is generally 0.1 μm or less, and the thickness of the transparent electrode serving as a common electrode disposed on the color-filter-layer side is generally 0.5 μm or less, even in the case where the thickness of the transparent electrode is increased in order to increase electrical conductivity. Therefore, it cannot be said that the color filter layer and the liquid crystal layer are in an environment where they are completely isolated from each other. Consequently, the impurities contained in the color filter layer, which migrate via an alignment film and a transparent electrode, may reduce the voltage holding ratio (VHR) of the liquid crystal layer and increase the ion density (ID) in the liquid crystal layer, which results in faulty display such as white missing pixels, alignment inconsistencies, and burn-in.

In order to address the faulty display caused by impurities contained in pigments constituting the color filter, a method in which elution of impurities into a liquid crystal is controlled by using a pigment such that the proportion of a substance extracted from the pigment with ethyl formate is set to be equal to or less than a specific value (Patent Literature 1) and a method in which elution of impurities into a liquid crystal is controlled by specifying a pigment contained in a blue colored layer (Patent Literature 2) have been studied. However, there is not a great difference between these methods and a method in which the amount of impurities contained in a pigment is just reduced, and these methods provide unsatisfactory improvements in addressing the faulty display in the present situation in which progress has been made in purification techniques for pigments.

On the other hand, focusing on the relationship between organic impurities contained in the color filter and the liquid crystal composition, a method in which the degree of difficulty in dissolving organic impurities in the liquid crystal layer is represented as a hydrophobicity parameter of liquid crystal molecules contained in the liquid crystal layer and the hydrophobicity parameter is controlled to be equal to or more than a specific value; and, on the basis of the correlation between the hydrophobicity parameter and a —$OCF_3$ group at the terminal of the liquid crystal molecule, a method in which the content of a liquid crystal compound having an —$OCF_3$ group at the terminal of the liquid crystal molecule in a liquid crystal composition is controlled to a specific value or more have been disclosed (Patent Literature 3).

However, the essence of the inventions disclosed in the cited documents is reducing the effect of impurities contained in a pigment on the liquid crystal layer, and there was no study on the direct relationship between the structure of a coloring material, such as a dye or a pigment, included in a color filter and the structure of a liquid crystal material.

The black matrix can be formed by depositing metal chromium such as chromium (Cr) or chromium oxide (CrOX) or a metal chromium compound by, for example, sputtering, forming an etching resist pattern on the deposited film using a positive photoresist, and etching a portion of the deposited metal chromium film which is exposed through the pattern, followed by removing the etching resist pattern. Alternatively, the black matrix may also be formed by photolithography using a photosensitive coloring resin composition including a black pigment, such as a carbon black, dispersed in the resin composition.

There has also been disclosed a technique in which occurrences of color inconsistency and a residual image can be reduced by using a black matrix containing a carbon black or a titanium black having high resistivity (Patent Literature 4). However, it has been impossible to address the faulty display of liquid crystal display elements, which are becoming more advanced, to a sufficient degree by this technique.

There has also been disclosed a fact that a photosensitive composition for black matrices which includes blue, yellow, and red organic pigments has a good insulating property, a low dielectric constant, and a high optical density (Patent Literature 5). However, the display properties of a liquid crystal display element produced using such a photosensitive composition are not described, and the faulty display of liquid crystal display elements, which are becoming more advanced, has not yet been addressed.

CITATION LIST

Patent Literature

PTL 1: Japanese Unexamined Patent Application Publication No. 2000-19321
PTL 2: Japanese Unexamined Patent Application Publication No. 2009-109542
PTL 3: Japanese Unexamined Patent Application Publication No. 2000-192040
PTL 4: Japanese Unexamined Patent Application Publication No. 2003-295169
PTL 5: Japanese Unexamined Patent Application Publication No. 2012-32697

SUMMARY OF INVENTION

Technical Problem

The present invention provides a liquid crystal display device including a specific liquid crystal composition and a color filter including a black matrix containing a specific pigment, which may limit a reduction in the voltage holding ratio (VHR) of a liquid crystal layer and an increase in the ion density (ID) in the liquid crystal layer and thereby address issues of faulty display such as white missing pixels, alignment inconsistencies, and burn-in.

Solution to Problem

In order to address the above-described issues, the inventors of the present invention have conducted extensive studies on the combination of the structure of a coloring material, such as a pigment, contained in a black matrix included in a color filter and the structure of a liquid crystal material constituting a liquid crystal layer. As a result, the inventors have found that a liquid crystal display device that includes a liquid crystal material having a specific structure and a color filter including a black matrix containing a specific pigment may limit a reduction in the voltage holding ratio (VHR) of a liquid crystal layer and an increase in the ion density (ID) in the liquid crystal layer and thereby address the issues of faulty display such as white missing pixels, alignment inconsistencies, and burn-in. Thus, the present invention was made.

Specifically, the present invention provides
a liquid crystal display device including a first substrate; a second substrate; a liquid crystal composition layer held between the first substrate and the second substrate; a color filter including a black matrix and at least an RGB three-color pixel portion; a pixel electrode; and a common electrode.

The liquid crystal composition layer is composed of a liquid crystal composition including one or more compounds represented by General Formula (I) and one or more compounds selected from the group consisting of compounds represented by General Formulae (II-a) to (II-f):

[Chem. 1]

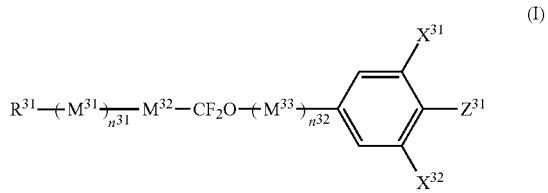

(In General Formula (I), $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— groups of the trans-1,4-cyclohexylene group may be replaced with a —O— group such that oxygen atoms are not directly adjacent to one another, and one or two hydrogen atoms of the phenylene group may be replaced with a fluorine atom; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2, and $n^{31}+n^{32}$ is 0, 1, or 2; and, when a plurality of $M^{31}$'s or a plurality of $M^{33}$'s are present, they may be identical or different)

[Chem. 2]

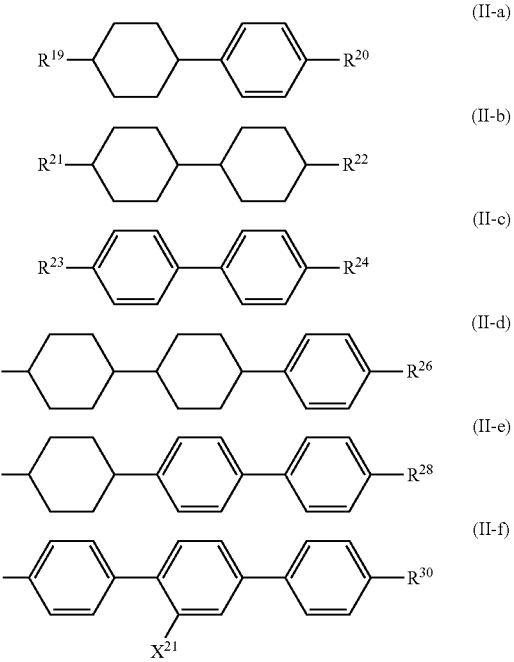

(In General Formulae (II-a) to (II-f), $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom).

The black matrix includes, as a coloring material, one or more pigments selected from carbon blacks, titanium blacks, and organic pigments.

Advantageous Effects of Invention

The liquid crystal display device according to the present invention includes a specific liquid crystal composition and a color filter including a black matrix containing a specific pigment, which may limit a reduction in the voltage holding ratio (VHR) of a liquid crystal layer and an increase in the ion density (ID) in the liquid crystal layer and thereby reduce the risk of faulty display such as white missing pixels, alignment inconsistencies, and burn-in.

BRIEF DESCRIPTION OF DRAWINGS

FIG. 1 is a diagram illustrating an example of a common liquid crystal display device of the related art.

FIG. 2 is a diagram illustrating an example of a liquid crystal display device according to the present invention.

REFERENCE SIGNS LIST

1 Substrate
2 Color filter layer
2a Color filter layer including a black matrix containing a specific pigment
3a Transparent electrode layer (common electrode)
3b Pixel electrode layer
4 Alignment film
5 Liquid crystal layer
5a Liquid crystal layer including a specific liquid crystal composition

DESCRIPTION OF EMBODIMENTS

FIG. 2 illustrates an example of the liquid crystal display device according to the present invention, which includes two substrates (1), namely, a first substrate and a second substrate, each including an alignment film (4) disposed thereon; a transparent electrode layer (3a) serving as a common electrode and a color filter layer (2a) including a black matrix containing a specific pigment, which are interposed between one of the alignment films and the corresponding substrate; and a pixel electrode layer (3b) interposed between the other alignment film and the corresponding substrate. The two substrates are arranged such that the alignment films face each other, and a liquid crystal layer (5a) including a specific liquid crystal composition is held therebetween.

The two substrates of the display apparatus are bonded together using a sealant and an encapsulant disposed in the periphery of the substrates. In many cases, granular spacers or resin spacer pillars formed by photolithography are disposed between the substrates in order to maintain a certain distance between the substrates.

(Liquid Crystal Composition Layer)

The liquid crystal composition layer included in the liquid crystal display device according to the present invention is composed of a liquid crystal composition including one or more compounds represented by General Formula (I) below and one or more compounds selected from the group consisting of compounds represented by General Formulae (II-a) to (II-f) below.

[Chem. 3]

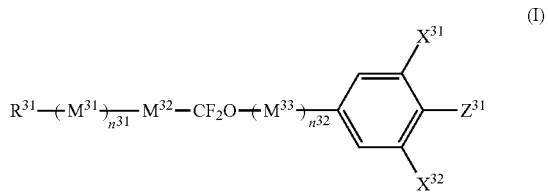

(In General Formula (I), $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— groups of the trans-1,4-cyclohexylene group may be replaced with a —O— group such that oxygen atoms are not directly adjacent to one another, and one or two hydrogen atoms of the phenylene group may be replaced with a fluorine atom; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2, and $n^{31}+n^{32}$ is 0, 1, or 2; and, when a plurality of $M^{31}$'s or a plurality of $M^{33}$'s are present, they may be identical or different)

[Chem. 4]

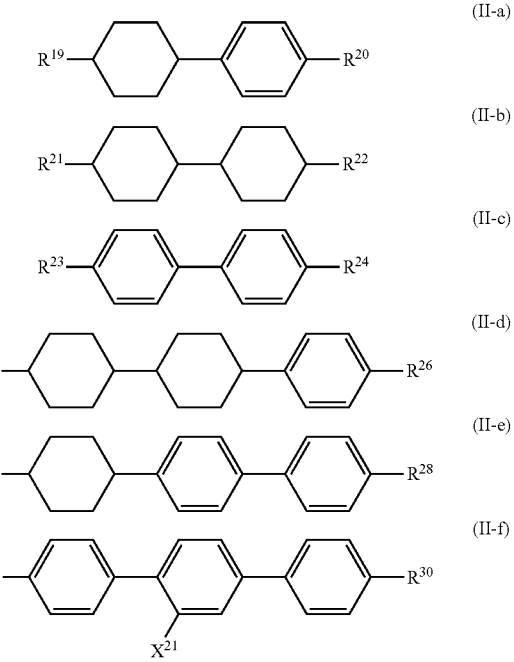

(In General Formulae (II-a) to (II-f), $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom)

In General Formula (I), $R^{31}$ is preferably a linear alkyl group having 1 to 5 carbon atoms, a linear alkoxy group having 1 to 4 (or more) carbon atoms, or an alkenyl group having 4 or 5 carbon atoms when the ring structure to which $R^{31}$ is bonded is a phenyl group (i.e., aromatic). When the ring structure to which $R^{31}$ is bonded is a saturated ring structure such as cyclohexane, pyran, or dioxane, $R^{31}$ is preferably a linear alkyl group having 1 to 5 carbon atoms, a linear alkoxy group having 1 to 4 (or more) carbon atoms, or a linear alkenyl group having 2 to 5 carbon atoms.

In the case where primary importance is placed on good chemical stability against heat and light, $R^{31}$ is preferably an alkyl group. In the case where primary importance is placed on production of liquid crystal display elements having a low viscosity and a high response speed, $R^{31}$ is preferably an alkenyl group. In order to achieve low viscosity and high nematic-isotropic liquid phase transition temperature (Tni), and further increase response speed, an alkenyl group that does not have an unsaturated bond at the terminal is preferably used. In this case, it is particularly preferable that a methyl group lies at the terminal adjacent to the alkenyl group. In the case where primary importance is placed on high solubility at low temperatures, one way to increase solubility at low temperatures is to use an alkoxy group as $R^{31}$. Another way is to use various types of $R^{31}$ in combination. For example, compounds including an alkyl group or an alkenyl group having 2, 3, or 4 carbon atoms as $R^{31}$ are preferably used in combination. Compounds having 3 or 5 carbon atoms are preferably used in combination. Compounds having 3, 4, or 5 carbon atoms are preferably used in combination.

$M^{31}$ to $M^{33}$ are preferably any one of the following structures.

[Chem. 5]

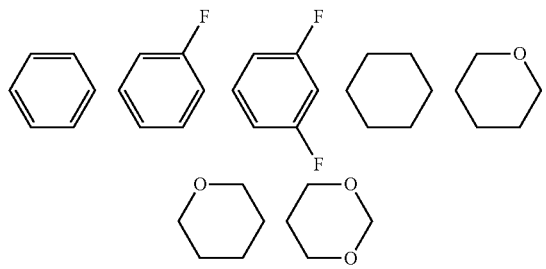

$M^{31}$ is preferably any one of the following structures.

[Chem. 6]

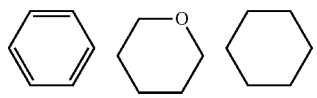

$M^{31}$ is further preferably any one of the following structures.

[Chem. 7]

$M^{32}$ is preferably any one of the following structures.

[Chem. 8]

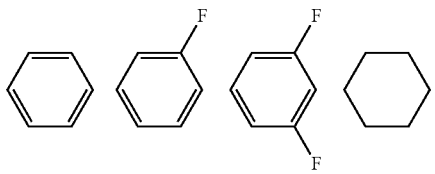

$M^{32}$ is more preferably any one of the following structures.

[Chem. 9]

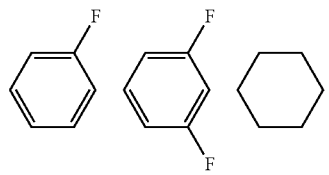

$M^{32}$ is further preferably any one of the following structures.

[Chem. 10]

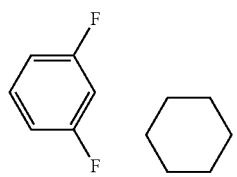

$M^{33}$ is preferably any one of the following structures.

[Chem. 11]

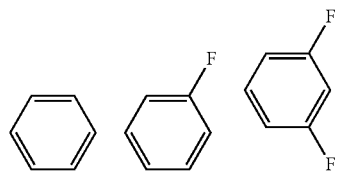

$M^{33}$ is more preferably any one of the following structures.

[Chem. 12]

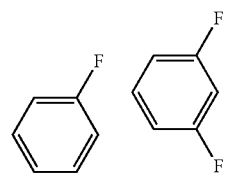

$M^{33}$ is further preferably the following structure.

[Chem. 13]

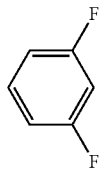

It is preferable that at least one of $X^n$ and $X^{32}$ is a fluorine atom. It is further preferable that both $X^n$ and $X^{32}$ are fluorine atoms.

$Z^{31}$ is preferably a fluorine atom or a trifluoromethoxy group.

The combination of $X^{31}$, $X^{32}$, and $Z^{31}$ is such that, in an embodiment, $X^{31}=F$, $X^{32}=F$, and $Z^{31}=F$. In another embodiment, $X^{31}=F$, $X^{32}=H$, and $Z^{31}=F$. In another embodiment, $X^{31}=F$, $X^{32}=H$, and $Z^{31}=OCF3$. In another embodiment, $X^{31}=F$, $X^{32}=F$, and $Z^{31}=OCF3$. In another embodiment, $X^{31}=H$, $X^{32}=H$, and $Z^{31}=OCF3$.

It is preferable that $n^{31}$ is 1 or 2, $n^{32}$ is preferably 0 or 1 and is further preferably 0, and $n^{31}+n^{32}$ is preferably 1 or 2 and is further preferably 2.

More specifically, the compounds represented by General Formula (I) are compounds represented by General Formulae (I-a) to (I-f) below.

[Chem. 14]

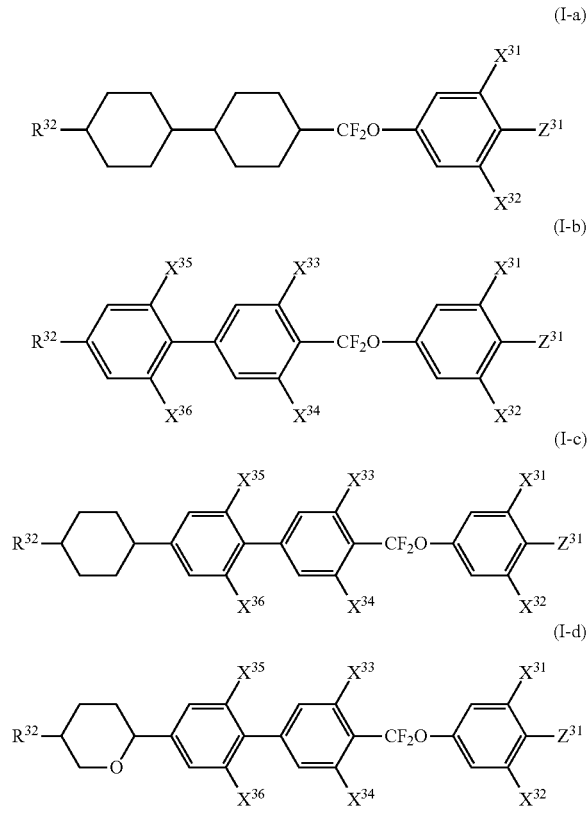

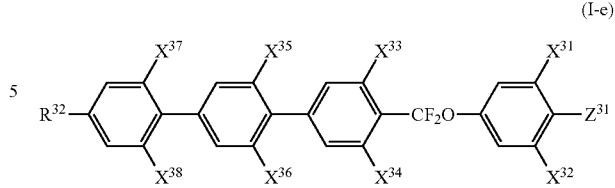

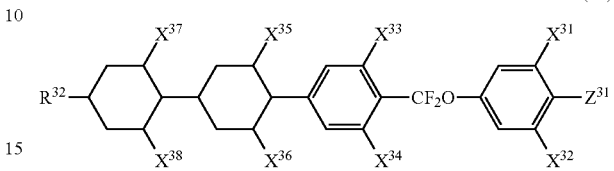

(In General Formulae (I-a) to (I-f), $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{31}$ to $X^{38}$ each independently represent a hydrogen atom or a fluorine atom; and $Z^{31}$ represents a fluorine atom, a trifluoromethoxy group, or a trifluoromethyl group)

In General Formulae (Ia) to (If), $R^{32}$ is preferably a linear alkyl group having 1 to 5 carbon atoms, a linear alkoxy group having 1 to 4 (or more) carbon atoms, or an alkenyl group having 4 or 5 carbon atoms when the ring structure to which $R^{32}$ is bonded is a phenyl group (i.e., aromatic). When the ring structure to which $R^{32}$ is bonded is a saturated ring structure such as cyclohexane, pyran, or dioxane, $R^{32}$ is preferably a linear alkyl group having 1 to 5 carbon atoms, a linear alkoxy group having 1 to 4 (or more) carbon atoms, or a linear alkenyl group having 2 to 5 carbon atoms.

In the case where primary importance is placed on good chemical stability to heat and light, $R^{32}$ is preferably an alkyl group. In the case where primary importance is placed on production of liquid crystal display elements having a low viscosity and a high response speed, $R^{32}$ is preferably an alkenyl group. In order to achieve low viscosity and high nematic-isotropic liquid phase transition temperature (Tni), and further increase response speed, an alkenyl group that does not have an unsaturated bond at the terminal is preferably used. In this case, it is particularly preferable that a methyl group lies at the terminal adjacent to the alkenyl group. In the case where primary importance is placed on high solubility at low temperatures, one way to increase solubility at low temperatures is to use an alkoxy group as $R^{32}$. Another way is to use various types of $R^{32}$ in combination. For example, compounds including an alkyl group or an alkenyl group having 2, 3, or 4 carbon atoms as $R^{32}$ are preferably used in combination. Compounds having 3 or 5 carbon atoms are preferably used in combination. Compounds having 3, 4, or 5 carbon atoms are preferably used in combination.

It is preferable that at least one of $X^{31}$ and $X^{32}$ is a fluorine atom. It is further preferable that both $X^{31}$ and $X^{32}$ are fluorine atoms.

$Z^{31}$ is preferably a fluorine atom or a trifluoromethoxy group.

The combination of $X^{31}$, $X^{32}$, and $Z^{31}$ is such that, in an embodiment, $X^{31}=F$, $X^{32}=F$, and $Z^{31}=F$. In another embodiment, $X^{31}=F$, $X^{32}=H$, and $Z^{31}=F$. In another embodiment, $X^{31}=F$, $X^{32}=H$, and $Z^{31}=OCF3$. In another embodiment, $X^{31}=F$, $X^{32}=F$, and $Z^{31}=OCF3$. In another embodiment, $X^{31}=H$, $X^{32}=H$, and $Z^{31}=OCF3$.

It is preferable that $n^{31}$ is 1 or 2, $n^{32}$ is preferably 0 or 1 and is further preferably 0, and $n^{31}+n^{32}$ is preferably 1 or 2 and is further preferably 2.

It is preferable that at least one of $X^{33}$ and $X^{34}$ is a fluorine atom. It is further preferable that both $X^{33}$ and $X^{34}$ are fluorine atoms.

It is preferable that at least one of $X^{35}$ and $X^{36}$ is a fluorine atom. Both of $X^{35}$ and $X^{36}$ being fluorine atoms is effective when $\Delta\in$ is increased, however, it is not preferable from the viewpoints of Tni, solubility at low temperatures, and the chemical stability of a liquid crystal display element produced using such a liquid crystal composition.

It is preferable that at least one of $X^{37}$ and $X^{38}$ is a hydrogen atom. It is preferable that both $X^{37}$ and $X^{38}$ are hydrogen atoms. However, it is not preferable that at least one of $X^{37}$ and $X^{38}$ is a fluorine atom from the viewpoints of Tni, solubility at low temperatures, and the chemical stability of a liquid crystal display element produced using such a liquid crystal composition.

The number of the compounds selected from compounds represented by General Formula (I) is preferably 1 to 8 and is particularly preferably 1 to 5. The content of the selected compounds is preferably 3% to 50% by mass and is more preferably 5% to 40% by mass.

In General Formulae (IIa) to (IIf), the substituents $R^{19}$ to $R^{30}$ are each preferably a linear alkyl group having 1 to 5 carbon atoms, a linear alkoxy group having 1 to 4 (or more) carbon atoms, or an alkenyl group having 4 or 5 carbon atoms when the ring structure to which the substituent is bonded is a phenyl group (i.e., aromatic). When the ring structure to which the substituent is bonded is a saturated ring structure such as cyclohexane, pyran, or dioxane, the substituents $R^{19}$ to $R^{30}$ are each preferably a linear alkyl group having 1 to 5 carbon atoms, a linear alkoxy group having 1 to 4 (or more) carbon atoms, or a linear alkenyl group having 2 to 5 carbon atoms.

In the case where primary importance is placed on good chemical stability to heat and light, $R^{19}$ to $R^{30}$ are preferably an alkyl group. In the case where primary importance is placed on production of liquid crystal display elements having a low viscosity and a high response speed, $R^{19}$ to $R^{30}$ are preferably an alkenyl group. In order to achieve low viscosity and high nematic-isotropic liquid phase transition temperature (Tni), and further increase response speed, an alkenyl group that does not have an unsaturated bond at the terminal is preferably used. In this case, it is particularly preferable that a methyl group lies at the terminal adjacent to the alkenyl group. In the case where primary importance is placed on high solubility at low temperatures, one way to increase solubility at low temperatures is to use alkoxy groups as $R^{19}$ to $R^{30}$. Another way is to use various types of $R^{19}$ to $R^{30}$ in combination. For example, compounds including alkyl groups or alkenyl groups having 2, 3, or 4 carbon atoms as $R^{19}$ to $R^{30}$ are preferably used in combination. Compounds having 3 or 5 carbon atoms are preferably used in combination. Compounds having 3, 4, or 5 carbon atoms are preferably used in combination.

It is preferable that $R^{19}$ and $R^{20}$ are an alkyl group or an alkoxy group. It is preferable that at least one of $R^{19}$ and $R^{20}$ is an alkoxy group. It is more preferable that $R^{19}$ is an alkyl group and $R^{20}$ is an alkoxy group. It is further preferable that $R^{19}$ is an alkyl group having 3 to 5 carbon atoms and $R^{20}$ is an alkoxy group having 1 or 2 carbon atoms.

It is preferable that $R^{21}$ and $R^{22}$ are an alkyl group or an alkenyl group and at least one of $R^{21}$ and $R^{22}$ is an alkenyl group. It is suitable that both $R^{21}$ and $R^{22}$ are alkenyl groups in order to increase response speed. However, it is not preferable that both $R^{21}$ and $R^{22}$ are alkenyl groups in the case where importance is placed on good chemical stability of a liquid crystal display element.

It is preferable that at least one of $R^{23}$ and $R^{24}$ is an alkyl group having 1 to 5 carbon atoms, an alkoxy group having 1 to 5 carbon atoms, or an alkenyl group having 4 or 5 carbon atoms. In the case where importance is placed on the balance between response speed and Tni, it is preferable that at least one of $R^{23}$ and $R^{24}$ is an alkenyl group. In the case where importance is placed on the balance between response speed and solubility at low temperatures, it is preferable that at least one of $R^{23}$ and $R^{24}$ is an alkoxy group.

It is preferable that at least one of $R^{25}$ and $R^{26}$ is an alkyl group having 1 to 5 carbon atoms, an alkoxy group having 1 to 5 carbon atoms, or an alkenyl group having 2 to 5 carbon atoms. In the case where importance is placed on the balance between response speed and Tni, it is preferable that at least one of $R^{25}$ and $R^{26}$ is an alkenyl group. In the case where importance is placed on the balance between response speed and solubility at low temperatures, it is preferable that at least one of $R^{25}$ and $R^{26}$ is an alkoxy group. It is more preferable that $R^{25}$ is an alkenyl group and $R^{26}$ is an alkyl group. It is also preferable that $R^{25}$ is an alkyl group and $R^{26}$ is an alkoxy group.

It is preferable that at least one of $R^{27}$ and $R^{28}$ is an alkyl group having 1 to 5 carbon atoms, an alkoxy group having 1 to 5 carbon atoms, or an alkenyl group having 2 to 5 carbon atoms. In the case where importance is placed on the balance between response speed and Tni, it is preferable that at least one of $R^{27}$ and $R^{28}$ is an alkenyl group. In the case where importance is placed on the balance between response speed and solubility at low temperatures, it is preferable that at least one of $R^{27}$ and $R^{28}$ is an alkoxy group. It is more preferable that $R^{27}$ is an alkyl group or an alkenyl group and $R^{28}$ is an alkyl group. It is also preferable that $R^{27}$ is an alkyl group and $R^{28}$ is an alkoxy group. It is particularly preferable that $R^{27}$ is an alkyl group and $R^{28}$ is an alkyl group.

$X^{21}$ is preferably a fluorine atom.

It is preferable that at least one of $R^{29}$ and $R^{30}$ is an alkyl group having 1 to 5 carbon atoms or an alkenyl group having 4 or 5 carbon atoms. In the case where importance is placed on the balance between response speed and Tni, it is preferable that at least one of $R^{29}$ and $R^{30}$ is an alkenyl group. In the case where importance is placed on reliability, it is preferable that at least one of $R^{29}$ and $R^{30}$ is an alkyl group. It is more preferable that $R^{29}$ is an alkyl group or an alkenyl group and $R^{30}$ is an alkyl group or an alkenyl group. It is also preferable that $R^{29}$ is an alkyl group and $R^{30}$ is an alkenyl group. It is also preferable that $R^{29}$ is an alkyl group and $R^{30}$ is an alkyl group.

The number of the compounds selected from the group consisting of compounds represented by General Formulae (II-a) to (II-f) is preferably 1 to 10 and is particularly preferably 1 to 8. The content of the selected compounds is preferably 5% to 80% by mass, is more preferably 10% to 70% by mass, and is particularly preferably 20% to 60% by mass.

The liquid crystal composition layer included in the liquid crystal display device according to the present invention may further include one or more compounds selected from the group consisting of compounds represented by General Formulae (III-a) to (III-f) below.

[Chem. 15]

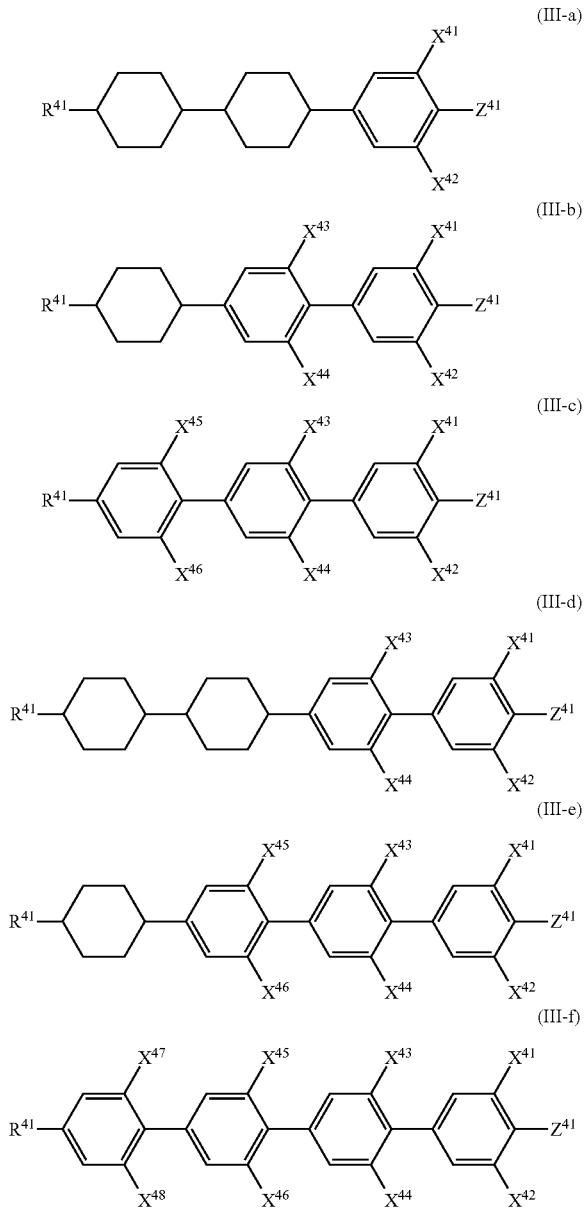

(In General Formulae (III-a) to (III-f), $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group)

In General Formulae (IIIa) to (IIIf), $R^{41}$ is preferably a linear alkyl group having 1 to 5 carbon atoms, a linear alkoxy group having 1 to 4 (or more) carbon atoms, or an alkenyl group having 4 or 5 carbon atoms when the ring structure to which $R^{41}$ is bonded is a phenyl group (i.e., aromatic). When the ring structure to which $R^{41}$ is bonded is a saturated ring structure such as cyclohexane, pyran, or dioxane, $R^{41}$ is preferably a linear alkyl group having 1 to 5 carbon atoms, a linear alkoxy group having 1 to 4 (or more) carbon atoms, or a linear alkenyl group having 2 to 5 carbon atoms.

In the case where primary importance is placed on good chemical stability to heat and light, $R^{41}$ is preferably an alkyl group. In the case where primary importance is placed on production of liquid crystal display elements having a low viscosity and a high response speed, $R^{41}$ is preferably an alkenyl group. In order to achieve low viscosity and high nematic-isotropic liquid phase transition temperature (Tni), and further increase response speed, an alkenyl group that does not have an unsaturated bond at the terminal is preferably used. In this case, it is particularly preferable that a methyl group lies at the terminal adjacent to the alkenyl group. In the case where primary importance is placed on high solubility at low temperatures, one way to increase solubility at low temperatures is to use an alkoxy group as $R^{41}$. Another way is to use various types of $R^{41}$ in combination. For example, compounds including an alkyl group or an alkenyl group having 2, 3, or 4 carbon atoms as $R^{41}$ are preferably used in combination. Compounds having 3 or 5 carbon atoms are preferably used in combination. Compounds having 3, 4, or 5 carbon atoms are preferably used in combination.

It is preferable that at least one of $X^{41}$ and $X^{42}$ is a fluorine atom. It is further preferable that both $X^{41}$ and $X^{42}$ are fluorine atoms.

$Z^{41}$ is preferably a fluorine atom or a trifluoromethoxy group.

The combination of $X^{41}$, $X^{42}$, and $Z^{41}$ is such that, in an embodiment, $X^{41}$=F, $X^{42}$=F, and $Z^{41}$=F. In another embodiment, $X^{41}$=F, $X^{42}$=H, and $Z^{41}$=F. In another embodiment, $X^{41}$=F, $X^{42}$=H, and $Z^{41}$=OCF3. In another embodiment, $X^{41}$=F, $X^{42}$=F, and $Z^{41}$=OCF3. In another embodiment, $X^{41}$=H, $X^{42}$=H, and $Z^{41}$=OCF3.

It is preferable that at least one of $X^{43}$ and $X^{44}$ is a fluorine atom. If both $X^{43}$ and $X^{44}$ are fluorine atoms, $\Delta\in$ is increased but solubility at low temperatures may fail to be enhanced.

It is preferable that at least one of $X^{45}$ and $X^{46}$ is a hydrogen atom and both $X^{45}$ and $X^{46}$ are hydrogen atoms. It is not preferable to use a large amount of fluorine atoms from the viewpoints of Tni, solubility at low temperatures, and the chemical stability of a liquid crystal display element produced using such a liquid crystal composition.

It is preferable that at least one of $X^{47}$ and $X^{48}$ is a hydrogen atom and both $X^{47}$ and $X^{48}$ are hydrogen atoms. It is not preferable that at least one of $X^{47}$ and $X^{48}$ is a fluorine atom from the viewpoints of Tni, solubility at low temperatures, and the chemical stability of a liquid crystal display element produced using such a liquid crystal composition.

The number of the compounds selected from the group consisting of compounds represented by General Formulae (III-a) to (III-f) is preferably 1 to 10 and is more preferably 1 to 8. The content of the selected compounds is preferably 5% to 50% by mass and is more preferably 10% to 40% by mass.

The liquid crystal composition constituting the liquid crystal composition layer included in the liquid crystal display device according to the present invention preferably has a $\Delta\in$ of +1.5 or more at 25° C. In order to achieve high-speed response, the $\Delta\in$ of the liquid crystal composition is preferably +1.5 to +4.0 and is more preferably +1.5 to +3.0. In order to achieve low-voltage driving, the $\Delta\in$ of the liquid crystal composition is preferably +8.0 to +18.0 and is more preferably +10.0 to +15.0. The Δn of the liquid crystal composition at 25° C. is preferably 0.08 to 0.14 and is more preferably 0.09 to 0.13. More specifically, the Δn of the liquid crystal composition at 25° C. is preferably 0.10 to 0.13 when the cell gap is small and is preferably 0.08 to 0.10 when the cell gap is large. The η of the liquid crystal composition at 20° C. is preferably 5 to 45 mPa·s, is more preferably 5 to 25 mPa·s, and is particularly preferably 10 to 20 mPa·s. The $T_{ni}$ of the liquid crystal composition is preferably 60° C. to 120° C., is more preferably 70° C. to 100° C., and is particularly preferably 70° C. to 85° C.

The liquid crystal composition according to the present invention may further include, in addition to the above-described compounds, ordinary nematic liquid crystals, smectic liquid crystals, and cholesteric liquid crystals.

The liquid crystal composition according to the present invention may include one or more polymerizable compounds in order to produce PS-mode, horizontal-electric-field-type PSA-mode, horizontal-electric-field-type PSVA-mode liquid crystal display elements or the like. Examples of the polymerizable compounds include photopolymerizable monomers that undergo polymerization when irradiated with energy beams such as light. Specific examples of such photopolymerizable monomers include polymerizable compounds having a liquid crystal skeleton constituted by a plurality of six-membered rings connected to one another, such as a biphenyl derivative and a terphenyl derivative. More specifically, the difunctional monomer represented by General Formula (V) is preferably used.

[Chem. 16]

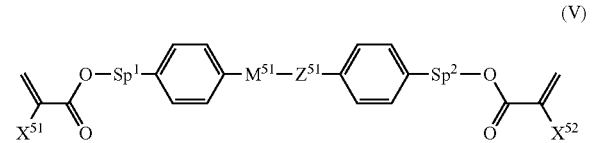

(V)

(In General Formula (V), $X^{51}$ and $X^{52}$ each independently represent a hydrogen atom or a methyl group; $Sp^1$ and $Sp^2$ each independently represent a single bond, an alkylene group having 1 to 8 carbon atoms, or —O—$(CH_2)_s$— (where s is an integer of 2 to 7 and the oxygen atom is bonded to an aromatic ring); $Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond;

$M^{51}$ represents a 1,4-phenylene group, a trans-1,4-cyclohexylene group, or a single bond; and, in all the 1,4-phenylene groups in General Formula (V), any hydrogen atom may be replaced with a fluorine atom)

A diacrylate derivative represented by General Formula (V) in which both $X^{51}$ and $X^{52}$ represent a hydrogen atom and a dimethacrylate derivative represented by General Formula (V) in which both $X^{51}$ and $X^{52}$ represent a methyl group are preferably used. A compound represented by General Formula (V) in which one of $X^{51}$ and $X^{52}$ represents a hydrogen atom and the other represents a methyl group is also preferably used. Among these compounds, the diacrylate derivative has the highest polymerization rate, the dimethacrylate derivative has the lowest polymerization rate, and the asymmetrical compound has the intermediate polymerization rate. A polymerizable compound suitable for a desired application may be selected. In PSA display elements, the dimethacrylate derivative is particularly preferably used.

$Sp^1$ and $Sp^2$ each independently represent a single bond, an alkylene group having 1 to 8 carbon atoms, or a —O—$(CH_2)_s$— group. In PSA display elements, it is preferable that at least one of $Sp^1$ and $Sp^2$ is a single bond, and it is also preferable that both $Sp^1$ and $Sp^2$ represent a single bond or one of $Sp^1$ and $Sp^2$ represents a single bond and the other represents an alkylene group having 1 to 8 carbon atoms or a —O—$(CH_2)_s$— group. In this case, an alkyl group having a carbon atom number of 1 to 4 is preferably used, and s is preferably 1 to 4.

$Z^{51}$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, is more preferably —COO—, —OCO—, or a single bond, and is particularly preferably a single bond.

$M^{51}$ represents a 1,4-phenylene group in which any hydrogen atom may be replaced with a fluorine atom, a trans-1,4-cyclohexylene group, or a single bond and is preferably a 1,4-phenylene group or a single bond. When $M^{51}$ is not a single bond but represents a ring structure, it is also preferable that $Z^{51}$ is a linking group other than a single bond. When $M^{51}$ is a single bond, $Z^{51}$ is preferably a single bond.

In light of the above-described points, specifically, the ring structure between $Sp^1$ and $Sp^2$ in General Formula (V) is preferably any one of the following structures.

When $M^{51}$ in General Formula (V) represents a single bond and the ring structure is constituted by two rings, the ring structure between $Sp^1$ and $Sp^2$ is preferably represented by any one of Formulae (Va-1) to (Va-5) below, is more preferably represented by any one of Formulae (Va-1) to (Va-3) below, and is particularly preferably represented by Formulae (Va-1).

[Chem. 17]

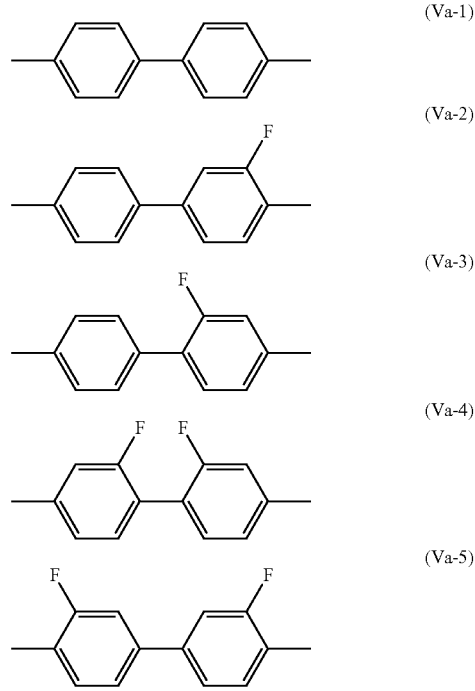

(Va-1)

(Va-2)

(Va-3)

(Va-4)

(Va-5)

(In Formulae (Va-1) to (Va-5), both terminals are bonded to Sp$^1$ and Sp$^2$, respectively)

A polymerizable compound having any one of these skeletons optimizes, after being polymerized, an anchoring force for a PSA liquid crystal display element, which improves an alignment state. Therefore, such a polymerizable compound reduces or eliminates the risk of display unevenness.

Thus, the polymerizable compound is particularly preferably any one of the compounds represented by General Formulae (V-1) to (V-4) and is most preferably the compound represented by General Formula (V-2).

[Chem. 18]

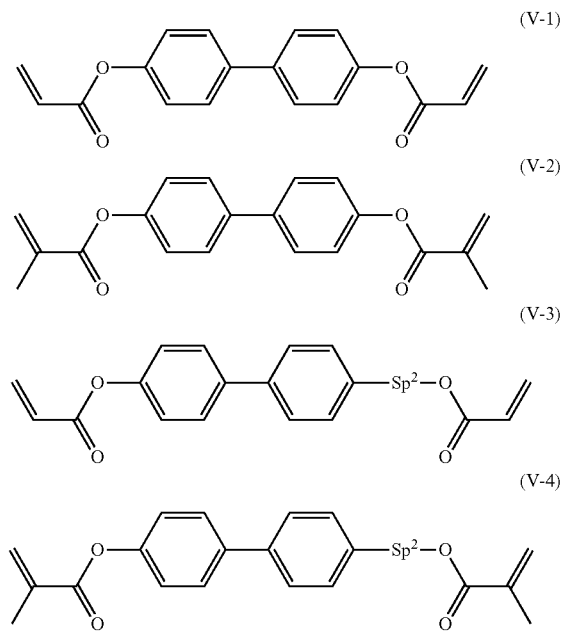

(In General Formulae (V-1) to (V-4), Sp$^2$ represents an alkylene group having 2 to 5 carbon atoms)

In the case where the polymerizable compound is added to the liquid crystal composition according to the present invention, a polymerization initiator may be used in order to promote polymerization. However, polymerization would proceed even in the absence of the polymerization initiator. Examples of the polymerization initiator include benzoin ethers, benzophenones, acetophenones, benzil ketals, and acylphosphine oxides.

When the liquid crystal composition according to the present invention containing the polymerizable compound is irradiated with ultraviolet rays, polymerization of the polymerizable compound occurs, which imparts a liquid crystal alignment capability. Thus, the liquid crystal composition according to the present invention is used for producing a liquid crystal display element, in which the amount of light transmitted is controlled using the birefringence of the liquid crystal composition. The liquid crystal composition according to the present invention can be used for producing liquid crystal display elements such as an AM-LCD (active matrix liquid crystal display element), a TN (nematic liquid crystal display element), a STN-LCD (super-twisted nematic liquid crystal display element), an OCB-LCD, and an IPS-LCD (in-plane switching liquid crystal display element), is particularly suitable for producing an AM-LCD, and can also be used for producing transmission-type or reflection-type liquid crystal display elements.

(Color Filter)

The color filter according to the present invention includes a black matrix and at least an RGB three-color pixel portion.

The black matrix includes, as a coloring material, one or more pigments selected from carbon blacks, titanium blacks, and organic pigments.

Examples of the carbon blacks include C.I. Pigment Black 6, C.I. Pigment Black 7, C.I. Pigment Black 8, and C.I. Pigment Black 10. C.I. Pigment Black 7 is preferably used. The resin-coated carbon black disclosed in Japanese Unexamined Patent Application Publication No. 2002-249678 may also be used.

Examples of the titanium blacks include C.I. Pigment Black 35, the fluororesin disclosed in Japanese Unexamined Patent Application Publication No. 2007-302836, and a water-repellent titanium black treated with a water-repellent substance such as a silicone resin.

Examples of the organic pigments include, as yellow organic pigments, C.I. Pigment Yellow 1, C.I. Pigment Yellow 1:1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 9, C.I. Pigment Yellow 10, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 31, C.I. Pigment Yellow 32, C.I. Pigment Yellow 34, C.I. Pigment Yellow 35, C.I. Pigment Yellow 35:1, C.I. Pigment Yellow 36, C.I. Pigment Yellow 36:1, C.I. Pigment Yellow 37, C.I. Pigment Yellow 37:1, C.I. Pigment Yellow 40, C.I. Pigment Yellow 41, C.I. Pigment Yellow 42, C.I. Pigment Yellow 43, C.I. Pigment Yellow 48, C.I. Pigment Yellow 53, C.I. Pigment Yellow 55, C.I. Pigment Yellow 61, C.I. Pigment Yellow 62, C.I. Pigment Yellow 62:1, C.I. Pigment Yellow 63, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 87, C.I. Pigment Yellow 93, C.I. Pigment Yellow 94, C.I. Pigment Yellow 95, C.I. Pigment Yellow 97, C.I. Pigment Yellow 100, C.I. Pigment Yellow 101, C.I. Pigment Yellow 104, C.I. Pigment Yellow 105, C.I. Pigment Yellow 108, C.I. Pigment Yellow 109, C.I. Pigment Yellow 110, C.I. Pigment Yellow 111, C.I. Pigment Yellow 116, C.I. Pigment Yellow 117, C.I. Pigment Yellow 119, C.I. Pigment Yellow 120, C.I. Pigment Yellow 126, C.I. Pigment Yellow 127, C.I. Pigment Yellow 127:1, C.I. Pigment Yellow 128, C.I. Pigment Yellow 129, C.I. Pigment Yellow 133, C.I. Pigment Yellow 134, C.I. Pigment Yellow 136, C.I. Pigment Yellow 138, C.I. Pigment Yellow 139, C.I. Pigment Yellow 142, C.I. Pigment Yellow 147, C.I. Pigment Yellow 148, C.I. Pigment Yellow 150, C.I. Pigment Yellow 151, C.I. Pigment Yellow 153, C.I. Pigment Yellow 154, C.I. Pigment Yellow 155, C.I. Pigment Yellow 157, C.I. Pigment Yellow 158, C.I. Pigment Yellow 159, C.I. Pigment Yellow 160, C.I. Pigment Yellow 161, C.I. Pigment Yellow 162, C.I. Pigment Yellow 163, C.I. Pigment Yellow 164, C.I. Pigment Yellow 165, C.I. Pigment Yellow 166, C.I. Pigment Yellow 167, C.I. Pigment Yellow 168, C.I. Pigment Yellow 169, C.I. Pigment Yellow 170, C.I. Pigment Yellow 172, C.I. Pigment Yellow 173, C.I. Pigment Yellow 174, C.I. Pigment Yellow 175, C.I. Pigment Yellow 176, C.I. Pigment Yellow 180, C.I. Pigment Yellow 181, C.I. Pigment Yellow 182, C.I. Pigment Yellow 183, C.I. Pigment Yellow 184, C.I. Pigment Yellow 185, C.I. Pigment Yellow 188, C.I. Pigment Yellow 189, C.I. Pigment Yellow 190, C.I.

Pigment Yellow 191, C.I. Pigment Yellow 191:1, C.I. Pigment Yellow 192, C.I. Pigment Yellow 193, C.I. Pigment Yellow 194, C.I. Pigment Yellow 195, C.I. Pigment Yellow 196, C.I. Pigment Yellow 197, C.I. Pigment Yellow 198, C.I. Pigment Yellow 199, C.I. Pigment Yellow 200, C.I. Pigment Yellow 202, C.I. Pigment Yellow 203, C.I. Pigment Yellow 204, C.I. Pigment Yellow 205, C.I. Pigment Yellow 206, C.I. Pigment Yellow 207, and C.I. Pigment Yellow 208.

Examples of the organic pigments include, as orange organic pigments, C.I. Pigment Orange 1, C.I. Pigment Orange 2, C.I. Pigment Orange 3, C.I. Pigment Orange 4, C.I. Pigment Orange 5, C.I. Pigment Orange 13, C.I. Pigment Orange 15, C.I. Pigment Orange 16, C.I. Pigment Orange 17, C.I. Pigment Orange 19, C.I. Pigment Orange 20, C.I. Pigment Orange 21, C.I. Pigment Orange 24, C.I. Pigment Orange 31, C.I. Pigment Orange 34, C.I. Pigment Orange 36, C.I. Pigment Orange 38, C.I. Pigment Orange 40, C.I. Pigment Orange 43, C.I. Pigment Orange 46, C.I. Pigment Orange 48, C.I. Pigment Orange 49, C.I. Pigment Orange 51, C.I. Pigment Orange 60, C.I. Pigment Orange 61, C.I. Pigment Orange 64, C.I. Pigment Orange 65, C.I. Pigment Orange 66, C.I. Pigment Orange 67, C.I. Pigment Orange 68, C.I. Pigment Orange 69, C.I. Pigment Orange 271, C.I. Pigment Orange 72, C.I. Pigment Orange 73, and C.I. Pigment Orange 81.

Examples of the organic pigments include, as red organic pigments, C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 12, C.I. Pigment Red 14, C.I. Pigment Red 15, C.I. Pigment Red 16, C.I. Pigment Red 17, C.I. Pigment Red 21, C.I. Pigment Red 22, C.I. Pigment Red 23, C.I. Pigment Red 31, C.I. Pigment Red 32, C.I. Pigment Red 37, C.I. Pigment Red 38, C.I. Pigment Red 41, C.I. Pigment Red 47, C.I. Pigment Red 48, C.I. Pigment Red 48:1, C.I. Pigment Red 48:2, C.I. Pigment Red 48:3, C.I. Pigment Red 48:4, C.I. Pigment Red 49, C.I. Pigment Red 49:1, C.I. Pigment Red 49:2, C.I. Pigment Red 50:1, C.I. Pigment Red 52:1, C.I. Pigment Red 52:2, C.I. Pigment Red 53, C.I. Pigment Red 53:1, C.I. Pigment Red 53:2, C.I. Pigment Red 53:3, C.I. Pigment Red 57, C.I. Pigment Red 57:1, C.I. Pigment Red 57:2, C.I. Pigment Red 58:4, C.I. Pigment Red 60, C.I. Pigment Red 63, C.I. Pigment Red 63:1, C.I. Pigment Red 63:2, C.I. Pigment Red 64, C.I. Pigment Red 64:1, C.I. Pigment Red 68, C.I. Pigment Red 69, C.I. Pigment Red 81, C.I. Pigment Red 81:1, C.I. Pigment Red 81:2, C.I. Pigment Red 81:3, C.I. Pigment Red 81:4, C.I. Pigment Red 83, C.I. Pigment Red 88, C.I. Pigment Red 90:1, C.I. Pigment Red 101, C.I. Pigment Red 101:1, C.I. Pigment Red 104, C.I. Pigment Red 108, C.I. Pigment Red 108:1, C.I. Pigment Red 109, C.I. Pigment Red 112, C.I. Pigment Red 113, C.I. Pigment Red 114, C.I. Pigment Red 122, C.I. Pigment Red 123, C.I. Pigment Red 144, C.I. Pigment Red 146, C.I. Pigment Red 147, C.I. Pigment Red 149, C.I. Pigment Red 151, C.I. Pigment Red 166, C.I. Pigment Red 168, C.I. Pigment Red 169, C.I. Pigment Red 170, C.I. Pigment Red 172, C.I. Pigment Red 173, C.I. Pigment Red 174, C.I. Pigment Red 175, C.I. Pigment Red 176, C.I. Pigment Red 177, C.I. Pigment Red 178, C.I. Pigment Red 179, C.I. Pigment Red 181, C.I. Pigment Red 184, C.I. Pigment Red 185, C.I. Pigment Red 187, C.I. Pigment Red 188, C.I. Pigment Red 190, C.I. Pigment Red 193, C.I. Pigment Red 194, C.I. Pigment Red 200, C.I. Pigment Red 202, C.I. Pigment Red 206, C.I. Pigment Red 207, C.I. Pigment Red 208, C.I. Pigment Red 209, C.I. Pigment Red 210, C.I. Pigment Red 214, C.I. Pigment Red 216, C.I. Pigment Red 220, C.I. Pigment Red 221, C.I. Pigment Red 224, C.I. Pigment Red 230, C.I. Pigment Red 231, C.I. Pigment Red 232, C.I. Pigment Red 233, C.I. Pigment Red 235, C.I. Pigment Red 236, C.I. Pigment Red 237, C.I. Pigment Red 238, C.I. Pigment Red 239, C.I. Pigment Red 242, C.I. Pigment Red 243, C.I. Pigment Red 245, C.I. Pigment Red 247, C.I. Pigment Red 249, C.I. Pigment Red 250, C.I. Pigment Red 251, C.I. Pigment Red 253, C.I. Pigment Red 254, C.I. Pigment Red 255, C.I. Pigment Red 256, C.I. Pigment Red 257, C.I. Pigment Red 258, C.I. Pigment Red 259, C.I. Pigment Red 260, C.I. Pigment Red 262, C.I. Pigment Red 263, C.I. Pigment Red 264, C.I. Pigment Red 265, C.I. Pigment Red 266, C.I. Pigment Red 267, C.I. Pigment Red 268, C.I. Pigment Red 269, C.I. Pigment Red 270, C.I. Pigment Red 271, C.I. Pigment Red 272, C.I. Pigment Red 273, C.I. Pigment Red 274, C.I. Pigment Red 275, and C.I. Pigment Red 276.

Examples of the organic pigments include, as purple organic pigments, C.I. Pigment Violet 1, C.I. Pigment Violet 2, C.I. Pigment Violet 3, C.I. Pigment Violet 5:1, C.I. Pigment Violet 13, C.I. Pigment Violet 15, C.I. Pigment Violet 16, C.I. Pigment Violet 17, C.I. Pigment Violet 19, C.I. Pigment Violet 23, C.I. Pigment Violet 25, C.I. Pigment Violet 29, C.I. Pigment Violet 31, C.I. Pigment Violet 32, C.I. Pigment Violet 34, C.I. Pigment Violet 35, C.I. Pigment Violet 36, C.I. Pigment Violet 37, C.I. Pigment Violet 38, C.I. Pigment Violet 41, C.I. Pigment Violet 44, and C.I. Pigment Violet 50.

Examples of the organic pigments include, as blue organic pigments, C.I. Pigment Blue 1, C.I. Pigment Blue 1:2, C.I. Pigment Blue 9, C.I. Pigment Blue 14, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 17, C.I. Pigment Blue 19, C.I. Pigment Blue 25, C.I. Pigment Blue 27, C.I. Pigment Blue 28, C.I. Pigment Blue 29, C.I. Pigment Blue 33, C.I. Pigment Blue 35, C.I. Pigment Blue 36, C.I. Pigment Blue 56, C.I. Pigment Blue 56:1, C.I. Pigment Blue 60, C.I. Pigment Blue 61, C.I. Pigment Blue 61:1, C.I. Pigment Blue 62, C.I. Pigment Blue 63, C.I. Pigment Blue 66, C.I. Pigment Blue 67, C.I. Pigment Blue 68, C.I. Pigment Blue 71, C.I. Pigment Blue 72, C.I. Pigment Blue 73, C.I. Pigment Blue 74, C.I. Pigment Blue 75, C.I. Pigment Blue 76, C.I. Pigment Blue 78, and C.I. Pigment Blue 79.

Examples of the organic pigments include, as green organic pigments, C.I. Pigment Green 1, C.I. Pigment Green 4, C.I. Pigment Green 7, C.I. Pigment Green 8, C.I. Pigment Green 10, C.I. Pigment Green 15, C.I. Pigment Green 17, C.I. Pigment Green 26, C.I. Pigment Green 36, C.I. Pigment Green 48, C.I. Pigment Green 50, and C.I. Pigment Green 58.

Examples of the organic pigments include, as brown organic pigments, C.I. Pigment Brown 5, C.I. Pigment Brown 6, C.I. Pigment Brown 23, C.I. Pigment Brown 24, C.I. Pigment Brown 25, C.I. Pigment Brown 32, C.I. Pigment Brown 38, C.I. Pigment Brown 41, and C.I. Pigment Brown 42.

Examples of the organic pigments include, as black organic pigments, C.I. Pigment Black 1, C.I. Pigment Black 9, C.I. Pigment Black 11, C.I. Pigment Black 20, C.I. Pigment Black 31, C.I. Pigment Black 32, and C.I. Pigment Black 34.

The above-described organic pigments may be used alone or in mixture of two or more. The number of the organic pigments used is preferably 1 to 6 and is preferably 1 to 4. The organic pigment that can be used alone are black organic pigments. For example, C.I. Pigment Black 31, C.I. Pigment Black 32, and C.I. Pigment Black 34 are preferably used. The organic pigments that can be used in mixture of two or more are preferably a mixture of a blue organic pigment, a purple organic pigment, a green organic pigment, and a red organic pigment and a mixture of a blue organic pigment, a red organic pigment, and a yellow organic pigment. For example, a mixture of C.I. Pigment Blue 60, C.I. Pigment Violet 23, C.I. Pigment Green 7, and C.I. Pigment Red 179, a mixture of C.I. Pigment Blue 60, C.I. Pigment Violet 19, and C.I. Pigment Green 7, a mixture of C.I. Pigment Blue 15:6, C.I. Pigment Red 254, and C.I. Pigment Yellow 150, a mixture of C.I. Pigment Blue 15:6, C.I. Pigment Red 177, and C.I. Pigment Yellow 150, a mixture of C.I. Pigment Blue 15:6, C.I. Pigment Red 254, and C.I. Pigment Yellow 138, and a mixture of C.I. Pigment Blue 15:6, C.I. Pigment Red 177, and C.I. Pigment Yellow 138 are preferably used.

The black matrix according to the present invention includes, as a coloring material, one or more pigments selected from carbon blacks, titanium blacks, and organic pigments. The number of the selected pigments is preferably 1 to 6, is preferably 1 to 5, and is preferably 1 to 4. The pigments may be selected from carbon blacks only, from titanium blacks only, or from organic pigments only. Alternatively, a carbon black and a titanium black; a carbon black and an organic pigment; a titanium black and an organic pigment; or a carbon black, a titanium black, and an organic pigment may be used in mixture. In particular, the pigments are preferably selected from carbon blacks only, from titanium blacks only, from organic pigments only, or from carbon blacks and organic pigments. In the case where the pigments are selected from carbon blacks and organic pigments, C.I. Pigment Black 7, C.I. Pigment Blue 15:3, C.I. Pigment Blue 15:4, and C.I. Pigment Blue 15:6 are preferably used.

The above-described carbon blacks, titanium blacks, and organic pigments preferably have a volume resistivity of $10^5$ Ω·cm or more and more preferably have a volume resistivity of $10^6$ Ω·cm or more.

The RGB three-color pixel portion is constituted by an R pixel portion including, as coloring materials, a diketopyrrolopyrrole pigment and/or an anionic red organic dye; a G pixel portion including, as a coloring material, at least one pigment or dye selected from the group consisting of halogenated metal phthalocynian pigments, phthalocyanine green dyes, and a mixture of a phthalocyanine blue dye and an azo yellow organic dye; and a B pixel portion including, as coloring materials, an ∈-type copper phthalocynian pigment, a triarylmethane pigment and/or a cationic blue organic dye.

The R pixel portion of the RGB three-color pixel portion preferably includes, as a coloring material, C.I. Solvent Red 124. The G pixel portion of the RGB three-color pixel portion preferably includes, as a coloring material, a mixture of C.I. Solvent Blue 67 and C.I. Solvent Yellow 162. The B pixel portion of the RGB three-color pixel portion preferably includes, as a coloring material, C.I. Solvent Blue 7.

It is also preferable that, in the RGB three-color pixel portion, the R pixel portion includes, as a coloring material, C.I. Pigment Red 254, the G pixel portion includes, as coloring materials, C.I. Pigment Green 7, C.I. Pigment Green 36, and/or C.I. Pigment Green 58, and the B pixel portion includes, as coloring materials, C.I. Pigment Blue 15:6 and/or a triarylmethane pigment.

The R pixel portion of the RGB three-color pixel portion preferably further includes, as a coloring material, at least one organic dye or pigment selected from the group consisting of C.I. Pigment Red 177, C.I. Pigment Red 242, C.I. Pigment Red 166, C.I. Pigment Red 167, C.I. Pigment Red 179, C.I. Pigment Orange 38, C.I. Pigment Orange 71, C.I. Pigment Yellow 150, C.I. Pigment Yellow 215, C.I. Pigment Yellow 185, C.I. Pigment Yellow 138, C.I. Pigment Yellow 139, C.I. Solvent Red 89, C.I. Solvent Orange 56, C.I. Solvent Yellow 21, C.I. Solvent Yellow 82, C.I. Solvent Yellow 83:1, C.I. Solvent Yellow 33, and C.I. Solvent Yellow 162.

The G pixel portion of the RGB three-color pixel portion preferably further includes, as a coloring material, at least one organic dye or pigment selected from the group consisting of C.I. Pigment Yellow 150, C.I. Pigment Yellow 215, C.I. Pigment Yellow 185, C.I. Pigment Yellow 138, C.I. Solvent Yellow 21, C.I. Solvent Yellow 82, C.I. Solvent Yellow 83:1, and C.I. Solvent Yellow 33.

The B pixel portion of the RGB three-color pixel portion preferably further includes, as a coloring material, at least one organic dye or pigment selected from the group consisting of C.I. Pigment Blue 1, C.I. Pigment Violet 23, C.I. Basic Blue 7, C.I. Basic Violet 10, C.I. Acid Blue 1, C.I. Acid Blue 90, C.I. Acid Blue 83, and C.I. Direct Blue 86.

It is also preferable that the color filter includes the black matrix, the RGB three-color pixel portion, and a Y pixel portion and the Y pixel portion includes, as a coloring material, at least one yellow organic dye or pigment selected from the group consisting of C.I. Pigment Yellow 150, C.I. Pigment Yellow 215, C.I. Pigment Yellow 185, C.I. Pigment Yellow 138, C.I. Pigment Yellow 139, C.I. Solvent Yellow 21, C.I. Solvent Yellow 82, C.I. Solvent Yellow 83:1, C.I. Solvent Yellow 33, and C.I. Solvent Yellow 162.

The diketopyrrolopyrrole red pigment included in the R pixel portion is preferably one or more pigments selected from C.I. Pigment Red 254, C.I. Pigment Red 255, C.I. Pigment Red 264, and C.I. Pigment Red 272, C.I. Pigment Orange 71, and C.I. Pigment Orange 73, is more preferably one or more pigments selected from C.I. Pigment Red 254, C.I. Pigment Red 255, C.I. Pigment Red 264, and C.I. Pigment Red 272, and is particularly preferably C.I. Pigment Red 254.

The halogenated metal phthalocyanine pigment included in the G pixel portion preferably includes a metal selected from the group consisting of Al, Si, Sc, Ti, V, Mg, Fe, Co, Ni, Zn, Cu, Ga, Ge, Y, Zr, Nb, In, Sn, and Pb as a central metal. When the central metal of the halogenated metal phthalocyanine pigment is trivalent, one atom or group selected from a halogen atom, a hydroxyl group, and a sulfonic group is preferably bonded to the central metal or the central metal is preferably oxo-cross-linked or thio-cross-linked. When the central metal of the halogenated metal phthalocyanine pigment is a tetravalent metal, one oxygen atom or two identical or different atoms or groups selected from a halogen atom, a hydroxyl group, and a sulfonic group are preferably bonded to the central metal. Examples of such a halogenated metal phthalocyanine pigment include halogenated metal phthalocyanine pigments belonging to the following two groups.

(Group 1)

Halogenated metal phthalocyanine pigments including a metal selected from the group consisting of Al, Si, Sc, Ti, V, Mg, Fe, Co, Ni, Zn, Cu, Ga, Ge, Y, Zr, Nb, In, Sn, and Pb as a central metal, wherein 8 to 16 halogen atoms per phthalocyanine molecule are bonded to the benzene rings of the phthalocyanine molecule and wherein, when the central metal is trivalent, one atom or group selected from a halogen atom, a hydroxyl group, and a sulfonic group ($-SO_3H$) is bonded to the central metal or, when the central metal is a tetravalent metal, one oxygen atom or two identical or different atoms or groups selected from a halogen atom, a hydroxyl group, and a sulfonic group are bonded to the central metal.

(Group 2)

Pigments that are halogenated metal phthalocyanine dimers having a structural unit constituted by two halogenated metal phthalocyanine molecules, the halogenated metal phthalocyanine molecules each including a trivalent metal selected from the group consisting of Al, Sc, Ga, Y, and In as a central metal and 8 to 16 halogen atoms bonded to the benzene rings of the phthalocyanine molecule, the central metals in the structural unit being bonded to each other via a divalent atomic group selected from the group consisting of an oxygen atom, a sulfur atom, sulfinyl (—SO—), and sulfonyl (—SO$_2$—).

In the halogenated metal phthalocyanine pigment, the halogen atoms bonded to the benzene rings may be all identical or different. Different halogen atoms may be bonded to one benzene ring.

When 9 to 15 bromine atoms of the 8 to 16 halogen atoms per phthalocyanine molecule are bonded to the benzene rings of the phthalocyanine molecule, such a halogenated metal phthalocyanine pigment appears yellowish-light green and is most suitably used for green pixel portions of the color filter. The halogenated metal phthalocyanine pigment is insoluble or hardly soluble in water and organic solvents. The halogenated metal phthalocyanine pigment may be a halogenated metal phthalocyanine pigment that has not yet been subjected to the finishing treatment described below (also referred to as "crude pigment") or may be a halogenated metal phthalocyanine pigment that has been subjected to the finishing treatment.

The halogenated metal phthalocyanine pigments belonging to Group 1 or 2 above can be represented by General Formula (PIG-1) below:

[Chem. 19]

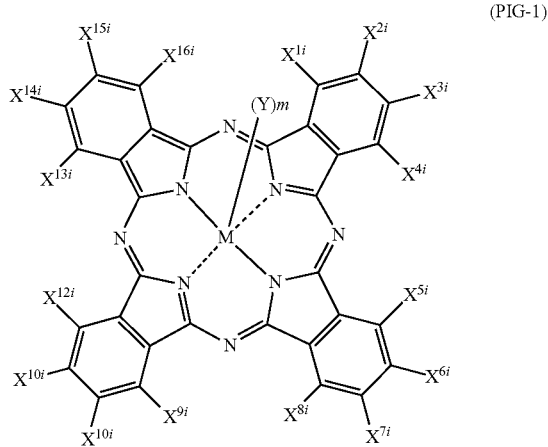

(PIG-1)

In General Formula (PIG-1), the halogenated metal phthalocyanine pigments belonging to Group 1 are as follows.

In General Formula (PIG-1), $X^{1i}$ to $X^{16i}$ represent a hydrogen atom, a chlorine atom, a bromine atom, or an iodine atom. The four atoms X bonded to one benzene ring may be identical or different. Among $X^{1i}$ to $X^{16i}$ bonded to the 4 benzene rings, 8 to 16 X's are chlorine atoms, bromine atoms, or iodine atoms. M represents a central metal. Among halogenated metal phthalocyanine pigments having the same Y described below and the same m, which is the number of Y's, a pigment in which, among 16 X's of $X^{1i}$ to $X^{16i}$, the total number of chlorine atoms, bromine atoms, and iodine atoms is less than 8 appears blue. In the same manner, among pigments in which, among 16 X's of $X^{1i}$ to $X^{16i}$, the total number of chlorine atoms, bromine atoms, and iodine atoms is 8 or more, the greater the total number of chlorine atoms, bromine atoms, and iodine atoms, the higher the degree of yellow. Y bonded to the central metal M is a monovalent atomic group selected from the group consisting of a halogen atom that is any one of a fluorine atom, a chlorine atom, a bromine atom, and an iodine atom; an oxygen atom; a hydroxyl group; and a sulfonic group, and m represents the number of Y's bonded to the central metal M and is an integer of 0 to 2.

The value of m is determined on the basis of the valence of the central metal M. When the central metal M is trivalent as is the case for Al, Sc, Ga, Y, and In, m=1. In this case, one atom or group selected from the group consisting of a fluorine atom, a chlorine atom, a bromine atom, an iodine atom, a hydroxyl group, and a sulfonic group is bonded to the central metal. When the central metal M is tetravalent as is the case for Si, Ti, V, Ge, Zr, and Sn, m=2. In this case, one oxygen atom is bonded to the central metal, or two groups selected from the group consisting of a fluorine atom, a chlorine atom, a bromine atom, an iodine atom, a hydroxyl group, and a sulfonic group are bonded to the central metal. When the central metal M is divalent as is the case for Mg, Fe, Co, Ni, Zn, Cu, Zr, Sn, and Pb, Y is absent.

In General Formula (PIG-1) shown above, the halogenated metal phthalocyanine pigments belonging to Group 2 are as follows.

In the General Formula (PIG-1), $X^{1i}$ to $X^{16i}$ are the same as defined above, the central metal M represents a trivalent metal selected from the group consisting of Al, Sc, Ga, Y, and In, and m is 1. Y represents the following atomic group:

[Chem. 20]

$Y =$ 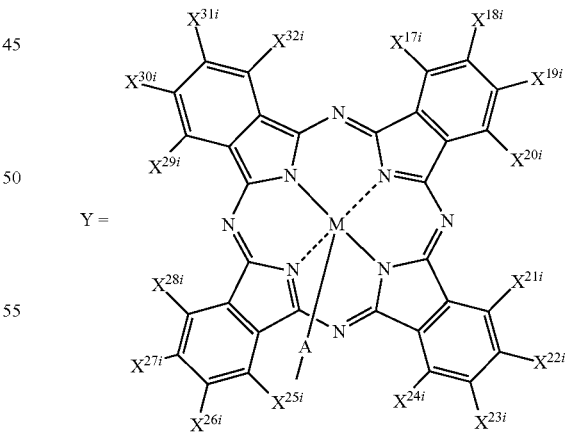

In the chemical structure of the atomic group Y, the central metal M is the same as defined above, and $X^{17i}$ to $X^{32i}$ are the same as the above-described definition of $X^{1i}$ to $X^{16i}$ in General Formula (PIG-1). A represents a divalent atomic group selected from the group consisting of an oxygen atom, a sulfur atom, sulfinyl (—SO—), and sulfonyl (—SO₂—). M of General Formula (PIG-1) and M of the atomic group Y are bonded to each other via the divalent atomic group A.

In other words, the halogenated metal phthalocyanine pigments belonging to Group 2 are halogenated metal phthalocyanine dimers having a structural unit constituted by two halogenated metal phthalocyanine molecules bonded to each other via the divalent atomic group.

Specific examples of the halogenated metal phthalocyanine pigments represented by General Formula (PIG-1) include (1) to (4) described below.

(1) Halogenated metal phthalocyanine pigments including a divalent metal selected from the group consisting of Mg, Fe, Co, Ni, Zn, Cu, Zr, Sn, and Pb as a central metal, in which 8 to 16 halogen atoms are bonded to 4 benzene rings per phthalocyanine molecule, such as a halogenated copper phthalocyanine pigment, a halogenated tin phthalocyanine pigment, a halogenated nickel phtalocyanine pigment, and a halogenated zinc phtalocyanine pigment. Among such halogenated metal phthalocyanine pigments, in particular, a chlorinated and brominated zinc phtalocyanine pigment, that is, C.I. Pigment Green 58, is preferably used.

(2) Halogenated metal phthalocyanine pigments including a trivalent metal selected from the group consisting of Al, Sc, Ga, Y, and In as a central metal, in which one atom or group selected from a halogen atom, a hydroxyl group, and a sulfonic group is bonded to the central metal and 8 to 16 halogen atoms are bonded to 4 benzene rings per phthalocyanine molecule, such as halogenated chloroaluminum phthalocyanine.

(3) Halogenated metal phthalocyanine pigments including a tetravalent metal selected from the group consisting of Si, Ti, V, Ge, Zr, and Sn as a central metal, in which one oxygen atom or two identical or different atoms or groups selected from a halogen atom, a hydroxyl group, and a sulfonic group are bonded to the central metal and 8 to 16 halogen atoms are bonded to 4 benzene rings per phthalocyanine molecule, such as halogenated oxytitanium phthalocyanine and halogenated oxyvanadium phthalocyanine.

(4) Pigments that are halogenated metal phthalocyanine dimers having a structural unit constituted by two halogenated metal phthalocyanine molecules, the halogenated metal phthalocyanine molecules each including a trivalent metal selected from the group consisting of Al, Sc, Ga, Y, and In as a central metal and 8 to 16 halogen atoms bonded to 4 benzene rings per phthalocyanine molecule, the central metals in the structural unit being bonded to each other via a divalent atomic group selected from the group consisting of an oxygen atom, a sulfur atom, sulfinyl, and sulfonyl, such as a halogenated μ-oxo-aluminium phthalocyanine dimer and a halogenated μ-thio-aluminium phthalocyanine dimer.

Specifically, the halogenated metal phthalocyanine pigment included in the G pixel portion is preferably one or more pigments selected from C.I. Pigment Green 7, C.I. Pigment Green 36, and C.I. Pigment Green 58 and is more preferably one or two pigments selected from C.I. Pigment Green 36 and C.I. Pigment Green 58.

The ∈-type phthalocynian pigment included in the B pixel portion is preferably C.I. Pigment Blue 15:6. The triarylmethane pigment included in the B pixel portion is preferably C.I. Pigment Blue 1 and/or a triarylmethane pigment represented by General Formula (1) below:

[Chem. 21]

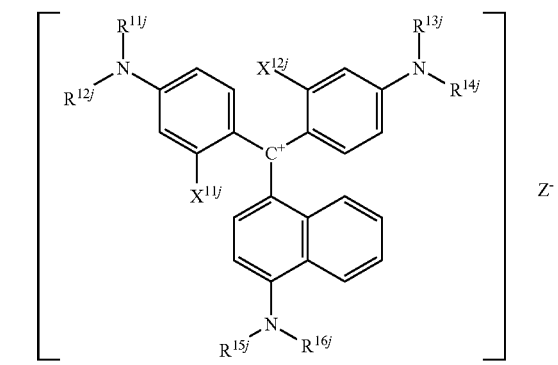

(1)

(in General Formula (1), $R^{11j}$ to $R^{16j}$ each independently represent a hydrogen atom, an alkyl group having 1 to 8 carbon atoms which may be substituted, or an aryl group which may be substituted; when $R^{11j}$ to $R^{16j}$ represent the alkyl group which may be substituted, adjacent $R^{11j}$ and $R^{12j}$, adjacent $R^{13j}$ and $R^{14j}$, and adjacent $R^{15j}$ and $R^{16j}$ may be bonded to each other to form a ring structure; $X^{11j}$ and $X^{12j}$ each independently represent a hydrogen atom, a halogen atom, or an alkyl group having 1 to 8 carbon atoms which may be substituted; $Z^-$ is at least one anion selected from a heteropolyoxometalate anion represented by $(P_2Mo_yW_{18-y}O_{62})^{6-}/6$ where y is an integer of 0, 1, 2, or 3, a heteropolyoxometalate anion represented by $(SiMoW_{11}O_{40})^{4-}/4$, and a lacunary Dawson-type phosphotungstic acid heteropolyoxometalate anion; and, when a plurality of structures represented by Formula (1) are present in one molecule, the structures may be identical or different).

In General Formula (1), $R^{11j}$ to $R^{16j}$ may be identical or different. Thus, the —NRR (RR represents any one combination of $R^{11j}/R^{12j}$, $R^{13j}/R^{14j}$, and $R^{15j}/R^{16j}$) group may be symmetrical or asymmetrical.

When adjacent R's (R represents any one of $R^{11j}$ to $R^{16j}$) are bonded to each other to form a ring, the ring may be formed by cross-linking of hetero atoms. Specific examples of such a ring include the following rings, which may be substituted:

[Chem. 22]

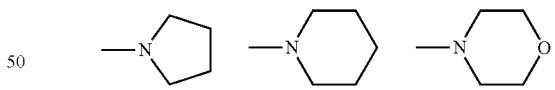

$R^{11j}$ to $R^{16j}$ are preferably each independently a hydrogen atom, an alkyl group which may be substituted, or an aryl group which may be substituted from the viewpoint of chemical stability.

In particular, $R^{11j}$ to $R^{16j}$ are more preferably each independently a hydrogen atom; an alkyl group such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, or a 2-ethylhexyl group; or an aryl group such as a phenyl group or a naphthyl group.

When $R^{11j}$ to $R^{16j}$ represent an alkyl group or an aryl group, the alkyl group or the aryl group may further include an optional substituent. Examples of the optional substituent that can be included in the alkyl group or the aryl group include the following [Substituent Group Y].

[Substituent Group Y]

Alkyl groups such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, and a 2-ethylhexyl group; aryl groups such as a phenyl group and a naphthyl group; halogen atoms such as a fluorine atom and a chlorine atom; a cyano group; a hydroxyl group; alkoxy groups having 1 to 8 carbon atoms, such as a methoxy group, an ethoxy group, a propoxy group, and a butoxy group; amino groups which may be substituted, such as an amino group, a diethylamino group, a dibutylamino group, and an acetylamino group; acyl groups such as an acetyl group and a benzoyl group; and acyloxy groups such as an acetyloxy group and a benzoyloxy group.

$R^{1j}$ to $R^{16j}$ are further preferably an alkyl group having 1 to 8 carbon atoms which may be substituted, that is, more specifically, any one of the following alkyl groups: alkyl groups which is not substituted, such as a methyl group, an ethyl group, a propyl group, an isopropyl group, a butyl group, an isobutyl group, a sec-butyl group, a pentyl group, a hexyl group, and a 2-ethylhexyl group; alkoxyalkyl groups such as a 2-methoxyethyl group and a 2-ethoxyethyl group; acyloxy groups such as a 2-acetyloxyethyl group; cyano-alkyl groups such as a 2-cyanoethyl group; and fluoroalkyl groups such as a 2,2,2-trifluoroethyl group and a 4,4,4-trifluorobutyl group.

When $X^{11j}$ and $X^{12j}$ are the above-described alkyl groups, $X^{11j}$ and $X^{12j}$ may further include an optional substituent. Examples of the optional substituent include halogen atoms such as a fluorine atom, a chlorine atom, a bromine atom, and an iodine atom; and alkoxy groups such as a methoxy group, an ethoxy group, and a propoxy group. Specific examples of $X^{11j}$ and $X^{12j}$ include haloalkyl groups such as a fluoromethyl group, a trifluoromethyl group, a trichloromethyl group, and a 2,2,2-trifluoroethyl group; and alkoxyalkyl groups such as a methoxymethyl group.

$X^{11j}$ and $X^{12j}$ are preferably a substituent that causes an appropriate degree of steric hindrance which does not affect torsion to occur, such as a hydrogen atom, a methyl group, a chlorine atom, or a trifluoromethyl group. $X^{11j}$ and $X^{12j}$ are most preferably a hydrogen atom, a methyl group, or a chlorine atom from the viewpoints of color tone and heat resistance.

$Z^-$ is at least one anionic triarylmethane compound selected from a heteropolyoxometalate anion represented by $(P_2Mo_yW_{18-y}O_{62})^{6-}/6$ where y is an integer of 0, 1, 2, or 3; a heteropolyoxometalate anion represented by $(SiMoW_{11}O_{40})^{4-}/4$; and a lacunary Dawson-type phosphotungstic acid heteropolyoxometalate anion. Specifically, the lacunary Dawson-type phosphotungstic acid is preferably a 1-lacunary Dawson-type phosphotungstic acid heteropolyoxometalate anion $(P_2W_{17}O_{61})^{10-}/10$ from the viewpoint of durability.

Specific examples of the triarylmethane pigment represented by General Formula (1) include the compounds shown in Tables 1 to 7 below. However, the present invention is not limited to these compounds as long as the idea of the present invention is not impaired.

TABLE 1

| No. | $R^{1j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 1 | C2H5— | C2H5— | C2H5— | C2H5— | C2H5— | H | H | H | (P2W18O62)6— |
| 2 | C2H5— | C2H5— | C2H5— | C2H5— | C2H5— | H | H | H | (P2MoW17O62)6— |
| 3 | C2H5— | C2H5— | C2H5— | C2H5— | C2H5— | H | H | H | (P2Mo2W16O62)6— |
| 4 | C2H5— | C2H5— | C2H5— | C2H5— | C2H5— | H | H | H | (P2Mo3W15O62)6— |
| 5 | C2H5— | C2H5— | C2H5— | C2H5— | C2H5— | H | H | H | (SiMoW11O40)4— |
| 6 | C2H5— | C2H5— | C2H5— | C2H5— | C2H5— | H | H | H | (P2W17O61)10— |
| 7 | CH3— | CH3— | CH3— | CH3— | C2H5— | H | H | H | (P2W18O62)6 |
| 8 | CH3— | CH3— | CH3— | CH3— | C2H5— | H | H | H | (P2MoW17O62)6— |
| 9 | CH3— | CH3— | CH3— | CH3— | C2H5— | H | H | H | (P2Mo3W15O62)6— |

TABLE 2

| No. | $R^{1j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 10 | CH3— | CH3— | CH3— | CH3— | C2H5— | H | H | H | (P2Mo3W15O62)6 |
| 11 | CH3— | CH3— | CH3— | CH3— | C2H5— | H | H | H | (SiMoW11O40)4— |
| 12 | CH3— | CH3— | CH3— | CH3— | C2H5— | H | H | H | (P2W17O61)10— |
| 13 | CH3— | CH3— | CH3— | CH3— | Ph— | H | H | H | (P2W18O62)6— |
| 14 | CH3— | CH3— | CH3— | CH3— | Ph— | H | H | H | (P2MoW17O62)6— |
| 15 | CH3— | CH3— | CH3— | CH3— | Ph— | H | H | H | (P2Mo2W16O62)6— |
| 16 | CH3— | CH3— | CH3— | CH3— | Ph— | H | H | H | (P2Mo3W15O62)6— |
| 17 | CH3— | CH3— | CH3— | CH3— | Ph— | H | H | H | (SiMoW11O40)4— |
| 18 | CH3— | CH3— | CH3— | CH3— | Ph— | H | H | H | (P2W17O61)10— |

TABLE 3

| No. | $R^{1j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 19 | CH3— | CH3— | CH3— | CH3— | Ph— | CH3— | H | H | (P2W18O62)6— |
| 20 | CH3— | CH3— | CH3— | CH3— | Ph— | CH3— | H | H | (P2MoW17O62)6— |
| 21 | CH3— | CH3— | CH3— | CH3— | Ph— | CH3— | H | H | (P2Mo2W16O62)6— |
| 22 | CH3— | CH3— | CH3— | CH3— | Ph— | CH3— | H | H | (P2Mo3W15O62)6— |
| 23 | CH3— | CH3— | CH3— | CH3— | Ph— | CH3— | H | H | (SiMoW11O40)4— |
| 24 | CH3— | CH3— | CH3— | CH3— | Ph— | CH3— | H | H | (P2W17O61)10— |

TABLE 3-continued

| No. | R$^{11j}$ | R$^{12j}$ | R$^{13j}$ | R$^{14j}$ | R$^{15j}$ | R$^{16j}$ | X$^{11j}$ | X$^{12j}$ | Z— |
|---|---|---|---|---|---|---|---|---|---|
| 25 | n-C3H7— | n-C3H7— | n-C3H7— | n-C3H7— | C2H5— | H | H | H | (P2W18O62)6— |
| 26 | n-C3H7— | n-C3H7— | n-C3H7— | n-C3H7— | C2H5— | H | H | H | (P2MoW17O62)6— |
| 27 | n-C3H7— | n-C3H7— | n-C3H7— | n-C3H7— | C2H5— | H | H | H | (P2Mo2W16O62)6— |

TABLE 4

| No. | R$^{11j}$ | R$^{12j}$ | R$^{13j}$ | R$^{14j}$ | R$^{15j}$ | R$^{16j}$ | X$^{11j}$ | X$^{12j}$ | Z— |
|---|---|---|---|---|---|---|---|---|---|
| 28 | C2H5— | C2H5— | C2H5— | C2H5— | C2H5— | H | CH3— | H | (P2W18O62)6— |
| 29 | C2H5— | C2H5— | C2H5— | C2H5— | C2H5— | H | CH3— | H | (P2MoW17O62)6— |
| 30 | C2H5— | C2H5— | C2H5— | C2H5— | C2H5— | H | CH3— | H | (P2Mo2W16O62)6— |
| 31 | C2H5— | C2H5— | C2H5— | C2H5— | C2H5— | H | CH3— | H | (P2Mo3W15O62)6— |
| 32 | C2H5— | C2H5— | C2H5— | C2H5— | C2H5— | H | CH3— | H | (SiMoW11O40)4— |
| 33 | C2H5— | C2H5— | C2H5— | C2H5— | C2H5— | H | CH3— | H | (P2W17O61)10— |
| 34 | C2H5— | C2H5— | C2H5— | C2H5— | C2H5— | H | CH3— | CH3— | (P2W18O62)6 |
| 35 | C2H5— | C2H5— | C2H5— | C2H5— | C2H5— | H | CH3— | CH3— | (P2MoW17O62)6— |
| 36 | C2H5— | C2H5— | C2H5— | C2H5— | C2H5— | H | CH3— | CH3— | (P2Mo3W15O62)6— |

TABLE 5

| No. | R$^{11j}$ | R$^{12j}$ | R$^{13j}$ | R$^{14j}$ | R$^{15j}$ | R$^{16j}$ | X$^{11j}$ | X$^{12j}$ | Z— |
|---|---|---|---|---|---|---|---|---|---|
| 37 | C2H5— | C2H5— | C2H5— | C2H5— | C2H5— | H | CH3— | CH3— | (P2Mo3W15O62)6— |
| 38 | C2H5— | C2H5— | C2H5— | C2H5— | C2H5— | H | CH3— | CH3— | (SiMoW11O40)4— |
| 39 | C2H5— | C2H5— | C2H5— | C2H5— | C2H5— | H | CH3— | CH3— | (P2W17O61)10— |
| 40 | C2H5— | C2H5— | C2H5— | C2H5— | C2H5— | H | Cl | H | (P2W18O62)6— |
| 41 | C2H5— | C2H5— | C2H5— | C2H5— | C2H5— | H | Cl | H | (P2MoW17O62)6— |
| 42 | C2H5— | C2H5— | C2H5— | C2H5— | C2H5— | H | Cl | H | (P2Mo2W16O62)6— |
| 43 | C2H5— | C2H5— | C2H5— | C2H5— | C2H5— | H | Cl | H | (P2Mo3W15O62)6— |
| 44 | C2H5— | C2H5— | C2H5— | C2H5— | C2H5— | H | Cl | H | (SiMoW11O40)4— |
| 45 | C2H5— | C2H5— | C2H5— | C2H5— | C2H5— | H | Cl | H | (P2W17O61)10— |

TABLE 6

| No. | R$^{11j}$ | R$^{12j}$ | R$^{13j}$ | R$^{14j}$ | R$^{15j}$ | R$^{16j}$ | X$^{11j}$ | X$^{12j}$ | Z— |
|---|---|---|---|---|---|---|---|---|---|
| 46 | C2H5— | C2H5— | C2H5— | C2H5— | C2H5— | C2H5— | H | H | (P2W18O62)6— |
| 47 | C2H5— | C2H5— | C2H5— | C2H5— | C2H5— | C2H5— | H | H | (P2MoW17O62)6— |
| 48 | C2H5— | C2H5— | C2H5— | C2H5— | C2H5— | C2H5— | H | H | (P2Mo2W16O62)6— |
| 49 | C2H5— | C2H5— | C2H5— | C2H5— | C2H5— | C2H5— | H | H | (P2Mo3W15O62)6— |
| 50 | C2H5— | C2H5— | C2H5— | C2H5— | C2H5— | C2H5— | H | H | (SiMoW11O40)4— |
| 51 | C2H5— | C2H5— | C2H5— | C2H5— | C2H5— | C2H5— | H | H | (P2W17O61)10— |
| 52 | ⬠(ring R11j-R12j) | | ⬠(ring R13j-R14j) | | C2H5— | H | H | H | (P2W18O62)6— |
| 53 | ⬠(ring R11j-R12j) | | ⬠(ring R13j-R14j) | | C2H5— | H | H | H | (P2MoW17O62)6— |
| 54 | ⬠(ring R11j-R12j) | | ⬠(ring R13j-R14j) | | C2H5— | H | H | H | (P2Mo2W16O62)6— |

TABLE 7

| No. | R$^{11j}$ | R$^{12j}$ | R$^{13j}$ | R$^{14j}$ | R$^{15j}$ | R$^{16j}$ | X$^{11j}$ | X$^{12j}$ | Z— |
|---|---|---|---|---|---|---|---|---|---|
| 55 | ⬠(ring R11j-R12j) | | ⬠(ring R13j-R14j) | | C2H5— | H | H | H | (P2Mo3W15O62)6— |
| 56 | ⬠(ring R11j-R12j) | | ⬠(ring R13j-R14j) | | C2H5— | H | H | H | (SiMoW11O40)4— |

TABLE 7-continued

| No. | R$^{1j}$ | R$^{12j}$ | R$^{13j}$ | R$^{14j}$ | R$^{15j}$ | R$^{16j}$ | X$^{11j}$ | X$^{12j}$ | Z— |
|---|---|---|---|---|---|---|---|---|---|
| 57 |  | |  | | C2H5— | H | H | H | (P2W17O61)10— |
| 58 | 4,4,4-tri-fluorobutyl | 4,4,4-tri-fluorobutyl | C2H5— | C2H5— | C2H5— | H | H | H | (P2W18O62)6— |
| 59 | 4,4,4-tri-fluorobutyl | 4,4,4-tri-fluorobutyl | C2H5— | C2H5— | C2H5— | H | H | H | (P2MoW17O62)6— |
| 60 | 4,4,4-tri-fluorobutyl | 4,4,4-tri-fluorobutyl | C2H5— | C2H5— | C2H5— | H | H | H | (SiMoW11O40)4— |
| 61 | 4,4,4-tri-fluorobutyl | 4,4,4-tri-fluorobutyl | C2H5— | C2H5— | C2H5— | H | CH3— | H | (P2W18O62)6— |
| 62 | 4,4,4-tri-fluorobutyl | 4,4,4-tri-fluorobutyl | C2H5— | C2H5— | C2H5— | H | CH3 | H | (P2MoW17O62)6— |
| 63 | 4,4,4-tri-fluorobutyl | 4,4,4-tri-fluorobutyl | C2H5— | C2H5— | C2H5— | H | CH3 | H | ((SiMoW11O40)4— |

The R pixel portion of the RGB three-color pixel portion preferably includes, as a coloring material, C.I. Solvent Red 124. The G pixel portion of the RGB three-color pixel portion preferably includes, as a coloring material, a mixture of C.I. Solvent Blue 67 and C.I. Solvent Yellow 162. The B pixel portion of the RGB three-color pixel portion preferably includes, as a coloring material, C.I. Solvent Blue 7.

It is also preferable that, in the RGB three-color pixel portion, the R pixel portion includes, as a coloring material, C.I. Pigment Red 254, the G pixel portion includes, as coloring materials, C.I. Pigment Green 7, C.I. Pigment Green 36, and/or C.I. Pigment Green 58, and the B pixel portion includes, as coloring materials, C.I. Pigment Blue 15:6 and/or a triarylmethane pigment.

The R pixel portion of the RGB three-color pixel portion preferably further includes, as a coloring material, at least one organic dye or pigment selected from the group consisting of C.I. Pigment Red 177, C.I. Pigment Red 242, C.I. Pigment Red 166, C.I. Pigment Red 167, C.I. Pigment Red 179, C.I. Pigment Orange 38, C.I. Pigment Orange 71, C.I. Pigment Yellow 150, C.I. Pigment Yellow 215, C.I. Pigment Yellow 185, C.I. Pigment Yellow 138, C.I. Pigment Yellow 139, C.I. Solvent Red 89, C.I. Solvent Orange 56, C.I. Solvent Yellow 21, C.I. Solvent Yellow 82, C.I. Solvent Yellow 83:1, C.I. Solvent Yellow 33, and C.I. Solvent Yellow 162.

The G pixel portion of the RGB three-color pixel portion preferably further includes, as a coloring material, at least one organic dye or pigment selected from the group consisting of C.I. Pigment Yellow 150, C.I. Pigment Yellow 215, C.I. Pigment Yellow 185, C.I. Pigment Yellow 138, C.I. Solvent Yellow 21, C.I. Solvent Yellow 82, C.I. Solvent Yellow 83:1, and C.I. Solvent Yellow 33.

The B pixel portion of the RGB three-color pixel portion preferably further includes, as a coloring material, at least one organic dye or pigment selected from the group consisting of C.I. Pigment Blue 1, C.I. Pigment Violet 23, C.I. Basic Blue 7, C.I. Basic Violet 10, C.I. Acid Blue 1, C.I. Acid Blue 90, C.I. Acid Blue 83, and C.I. Direct Blue 86.

It is also preferable that the color filter includes the black matrix, the RGB three-color pixel portion, and a Y pixel portion and the Y pixel portion includes, as a coloring material, at least one yellow organic dye or pigment selected from the group consisting of C.I. Pigment Yellow 150, C.I. Pigment Yellow 215, C.I. Pigment Yellow 185, C.I. Pigment Yellow 138, C.I. Pigment Yellow 139, C.I. Solvent Yellow 21, C.I. Solvent Yellow 82, C.I. Solvent Yellow 83:1, C.I. Solvent Yellow 33, and C.I. Solvent Yellow 162.

The black matrix included in the color filter can be formed by any publicly known method. An example of the common methods for forming the black matrix is photolithography, in which a photo-curable compound deposited on a portion corresponding to the black matrix is cured by ultraviolet irradiation through a photomask, that is, pattern exposure, and subsequently the other portion that has not been exposed to light is developed with a developing solution in order to fix a black matrix to a transparent substrate. Another example is a method in which a metal thin film is formed by, for example, sputtering, an etching resist pattern is formed on the thin film using a positive photoresist, subsequently the portion of the metal film which is exposed through the resist pattern is etched, and the etching resist pattern is removed in order to form the black matrix. The pixel portions included in the color filter can also be formed by any publicly known method. A common method for forming the pixel portions is photolithography. In photolithography, the photo-curable composition described below is applied to a surface of a transparent substrate for color filters on which a black matrix has been formed and then dried by being heated (pre-baked). Subsequently, the surface of the transparent substrate is irradiated with ultraviolet rays through a photomask, that is, subjected to pattern exposure, to cure portions of the photo-curable compound corresponding to pixel portions. The other portions of the photo-curable compound which have not exposed to light are developed with a developing solution, and non-pixel portions are removed. Thus, the pixel portions are fixed on the transparent substrate. In this method, pixel portions formed of a cured, colored coating film composed of the photo-curable composition are formed on the transparent substrate.

For each colored pixels of R pixels, G pixels, B pixels, and, as needed, other color pixels such as Y pixels, the photo-curable compositions described below are prepared and the above-described operations are repeated to produce a color filter including colored pixel portions of R pixels, G pixels, B pixels, and Y pixels formed at the respective predetermined positions.

The photo-curable composition described below can be applied to a transparent substrate composed of glass or the like by, for example, spin coating, roll coating, or an ink-jet method.

The conditions under which the coating film composed of the photo-curable composition deposited on a transparent substrate is dried vary depending on, for example, the types of and proportions of the constituents of the photo-curable composition, but are generally at 50° C. to 150° C. for about 1 to 15 minutes. Light used for photo-curing of the photo-curable composition is preferably ultraviolet rays in the wavelength range of 200 to 500 nm or visible light. Any light source that emits light in this wavelength range may be used.

Examples of a developing method include a liquid application method, a dipping method, and a spraying method. After the exposure and development of the photo-curable composition, the transparent substrate on which the pixel portions of the desired colors are formed is washed with water and then dried. The resulting color filter is subjected to a heat treatment (post-baking) at 90° C. to 280° C. for a predetermined time using a heating device such as a hot plate or an oven. This removes volatile constituents contained in the colored coating film and also causes an unreacted portion of the photo-curable compound which remains in the cured, colored coating film composed of the photo-curable composition to heat-cure. Thus, a color filter is formed.

By using the above-described coloring material for black matrices according to the present invention in combination with the liquid crystal composition according to the present invention, a liquid crystal display device that may limit a reduction in the voltage holding ratio (VHR) of the liquid crystal layer and an increase in the ion density (ID) of the liquid crystal layer and thereby address the issues of faulty display such as white missing pixels, alignment inconsistencies, and burn-in, can be provided.

In general, the photo-curable composition for black matrices, R pixels, G pixels, B pixels, or Y pixels can be prepared in the following manner. Essential components, that is, the pigment for black matrices according to the present invention or the dye and/or pigment composition for color filter pixel portions according to the present invention, an organic solvent, and a dispersant, are mixed together. The resulting mixture is stirred so as to uniformly disperse these components. Thus, a pigment dispersion for black matrices or color filter pixel portions is prepared. Then, a photo-curable compound and, as needed, a thermoplastic resin, a photopolymerization initiator, and the like are added to the pigment dispersion to prepare a photo-curable composition.

Examples of the organic solvent used above include aromatic compound solvents such as toluene, xylene, and methoxybenzene; acetic acid ester solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate; propionate solvents such as ethoxyethyl propionate; alcohol solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethylformamide, γ-butyrolactam, N-methyl-2-pyrrolidone, aniline, and pyridine; lactone solvents such as γ-butyrolactone; and carbamic acid ester such as a 48:52 mixture of methyl carbamate and ethyl carbamate.

Examples of the dispersant used above include DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, DISPERBYK 2150, DISPERBYK LPN21116, and DISPERBYK LPN6919 produced by BYK-Chemie; EFKA 46, EFKA 47, EFKA 452, EFKA LP4008, EFKA 4009, EFKA LP4010, EFKA LP4050, LP4055, EFKA 400, EFKA 401, EFKA 402, EFKA 403, EFKA 450, EFKA 451, EFKA 453, EFKA 4540, EFKA 4550, EFKA LP4560, EFKA 120, EFKA 150, EFKA 1501, EFKA 1502, and EFKA 1503 produced by EFKA; Solsperse 3000, Solsperse 9000, Solsperse 13240, Solsperse 13650, Solsperse 13940, Solsperse 17000, 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000 produced by Lubrizol Corporation; and AJISPER PB711, AJISPER PB821, AJISPER PB822, AJISPER PB814, AJISPER PN411, and AJISPER PA111 produced by Ajinomoto Co., Inc. In addition, acrylic resins; urethane resins; alkyd resins; natural rosins such as a wood rosin, a gum rosin, and a tall rosin; and synthetic resins that are insoluble in water and liquid at room temperature may also be used. Examples of such synthetic resins include polymerized rosins, disproportionated rosins, hydrogenated rosins, oxidized rosins, modified rosins such as a maleated rosin, rosin amine, lime rosin, and rosin derivatives such as alkylene oxide adducts of a rosin, alkyd adducts of a rosin, and a rosin-modified phenol. Addition of the above-described dispersants and the above-described resins also contributes to reduction in flocculation, improvement of the dispersion stability of the pigments, and improvement of the viscometric property of the dispersion solutions.

An organic pigment derivative such as a phthalimidemethyl derivative, a phthalimide-sulfonic acid derivative, a phthalimide-N-(dialkylamino)methyl derivative, or a phthalimide-N-(dialkylaminoalkyl)sulfonic acid amide derivative may also be used as a dispersing aid. Needless to say, two or more different types of these derivatives may be used in combination.

Examples of the thermoplastic resin used for preparing the photo-curable composition include a urethane resin, an acrylic resin, a polyamide resin, a polyimide resin, a styrene-maleic acid-based resin, and a styrene-maleic anhydride-based resin.

Examples of the photo-curable compound include difunctional monomers such as 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate; multifunctional monomers having a relatively low molecular weight, such as trimethylolpropatone triacrylate, pentaerythritol triacrylate, tris[2-(meth)acryloyloxyethyl]isocyanurate, dipentaerythritol hexaacrylate, and dipentaerythritol pentaacrylate; and multifunctional monomers having a relatively high molecular weight, such as polyester acrylate, polyurethane acrylate, and polyether acrylate.

Examples of the photopolymerization initiator include acetophenone, benzophenone, benzildimethylketanol, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of commercially available photopolymerization initiators include "Irgacure (trade name)-184", "Irgacure (trade name)-369", "Darocur (trade name)-1173", and "Lucirin-TPO" produced by BASF, "KAYACURE (trade name) DETX" and "KAYACURE (trade name) OA" produced by Nippon Kayaku Co., Ltd., "Vicure 10" and "Vicure 55" produced by Stauffer Chemical Co., "Trigonal PI"

produced by Akzo Nobel N.V., "Sandrey 1000" produced by Sand, "Deep" produced by Upjohn Company, and "Biimidazole" produced by KUROGANE KASEI Co., Ltd.

Publicly known, commonly used photosensitizers may be used in combination with the above-described photopolymerization initiators. Examples of the photosensitizers include amines, ureas, compounds containing a sulfur atom, compounds containing a phosphorus atom, compounds containing a chlorine atom, nitriles, and other compounds containing a nitrogen atom. These photosensitizers may be used alone or in combination of two or more.

The mixing proportion of the photopolymerization initiator is preferably, but is not particularly limited to, 0.1% to 30% by mass relative to the amount of compounds including a photo-polymerizable or photo-curable functional group. If the mixing proportion of the photopolymerization initiator is less than 0.1%, the photographic sensitivity during photo-curing may decrease. If the mixing proportion of the photopolymerization initiator exceeds 30%, the crystal of the photopolymerization initiator may precipitate when a pigment-dispersed resist coating film is dried, which deteriorates the physical properties of the coating film.

Using the above-described materials, by mass, 100 parts of the pigment for black matrices according to the present invention or the dye and/or pigment composition for color filter pixel portions according to the present invention is mixed with 20 to 1000 parts of an organic solvent and 1 to 100 parts of a dispersant, and the resulting mixture is stirred so as to uniformly disperse the components. Thus, the above-described dye and/or pigment dispersion can be prepared. Subsequently, a thermoplastic resin, a photo-curable compound, a photopolymerization initiator, and, as needed, an organic solvent are added to the pigment dispersion such that the total amount of the thermoplastic resin and the photo-curable compound is 3 to 20 parts relative to 1 part of the pigment for black matrices according to the present invention or the dye and/or pigment composition for color filters according to the present invention and the amount of the photopolymerization initiator is 0.05 to 3 parts relative to 1 part of the photo-curable compound. The resulting mixture is stirred so as to uniformly disperse the above components. Thus, a photo-curable composition for black matrices or color filter pixel portions is prepared.

Publicly known and commonly used organic solvents and aqueous alkaline solutions may be used as a developing solution. In particular, when the photo-curable composition includes a thermoplastic resin or a photo-curable compound and at least one of them has an acid value and alkali-solubility, washing with an aqueous alkaline solution may be effective in forming black matrices and color filter pixel portions.

Although a method for producing pixel portions of the color filter by photolithography is described above in detail, alternatively, the pixel portions of the color filter according to the present invention, which are prepared using the pigment composition for color filters, may be formed by another method such as an electrodeposition method, a transfer method, a micelle electrolysis method, a PVED (photovoltaic electrodeposition) method, an ink-jet method, a reverse printing method, or a thermosetting method. The pixel portions are formed for each color to produce a color filter.

Although a method for producing the black matrix using photolithography is described in detail above, alternatively, the black matrix according to the present invention, which is prepared using coloring materials for black matrices, can also be produced by another method such as a transfer method, an ink-jet method, a reverse printing method, or a thermosetting method.

(Alignment Film)

In the liquid crystal display device according to the present invention, when an alignment film is provided on surfaces of the first and second substrates which are in contact with a liquid crystal composition in order to align the liquid crystal composition, the alignment film is disposed between the color filter and the liquid crystal layer. The thickness of the alignment film is small, that is, 100 nm or less at most. Thus, the alignment film does not completely block the interaction between coloring agents such as pigments constituting the color filter and a liquid crystal compound constituting the liquid crystal layer.

In a liquid crystal display device that does not include the alignment film, the interaction between coloring agents, such as pigments, constituting the color filter and a liquid crystal compound constituting the liquid crystal layer becomes stronger.

The alignment film may be composed of, for example, a transparent organic material such as polyimide, polyamide, BCB (benzocyclobutene polymer), or polyvinyl alcohol. In particular, a polyimide alignment film formed by imidization of a polyamic acid prepared by synthesizing a diamine such as an aliphatic or alicyclic diamine (e.g., p-phenylenediamine or 4,4'-diaminodiphenylmethane) with an aliphatic or alicyclic tetracarboxylic acid anhydride (e.g., butanetetracarboxylic acid anhydride or 2,3,5-tricarboxycyclopentyl acetic acid anhydride) or with an aromatic tetracarboxylic acid anhydride (e.g., pyromellitic dianhydride) is preferably used. In this case, generally, alignment is performed by rubbing. When the film serves as a vertical alignment film or the like, alignment is not necessarily performed.

The alignment film may be composed of a material including chalcone, cinnamate, cinnamoyl, or an azo group in the compound. Such a material can be used in combination with polyimide, polyamide, or the like. In such a case, alignment may be performed by rubbing or using a photo-alignment technology.

In order to form the alignment film, in general, the above-described material of the alignment film is applied to a substrate by spin coating to form a resin film. Alternatively, a uniaxial stretching method, the Langmuir-Blodgett method, and the like may also be employed.

(Transparent Electrode)

In the liquid crystal display device according to the present invention, the transparent electrode may be composed of a conductive metal oxide. Examples of the metal oxide include indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-doped titanium dioxide ($Ti_{1-x}Nb_xO_2$), fluorine-doped tin oxide, graphene nanoribbon, and metal nanowire. Zinc oxide (ZnO), indium tin oxide ($In_2O_3$—$SnO_2$), and indium zinc oxide ($In_2O_3$—ZnO) are preferably used. These transparent conductive films can be patterned by, for example, photo-etching or using a mask.

The liquid crystal display device according to the present invention can be suitably used, in particular, as a liquid crystal display device for active-matrix driving and may be used as a TN-mode, an IPS-mode, a polymer stabilized IPS-mode, an FFS-mode, an OCB-mode, a VA-mode, or an ECB-mode liquid crystal display device.

The liquid crystal display device can be used, in combination with a backlight, in various applications such as liquid crystal display televisions, monitors of personal computers, displays of mobile phones and smart phones, notebook-sized personal computers, personal digital assistants, and digital signage systems. Examples of the backlight include a cold-cathode tube-type backlight; and a pseudo-white backlight having two wavelength peaks and a backlight having three wavelength peaks that include a light-emitting diode including an inorganic material or an organic El element.

EXAMPLES

The present invention is further described in detail below with reference to Examples, which do not limit the present invention. When referring to a composition in Examples and Comparative Examples, "%" always denotes "% by mass".

The following properties were measured in Examples.

$T_{ni}$: Nematic phase-isotropic liquid phase transition temperature (° C.)

Δn: Refractive index anisotropy at 25° C.

Δ∈: Dielectric anisotropy at 25° C.

η: Viscosity at 20° C. (mPa·s)

γ1: Rotational viscosity at 25° C. (mPa·s)

VHR: Voltage holding ratio at 70° C. (%)

(the ratio (%) of a voltage measured when a voltage of 5 V was applied to a cell having a thickness of 3.5 μm in which the liquid crystal composition had been injected at a frame time of 200 ms and a pulse width of 64 μs relative to the initially applied voltage)

ID: Ion density at 70° C. (pC/cm$^2$)

(an ion density measured with MTR-1 (produced by TOYO Corporation) when a voltage of 20 V was applied to a cell having a thickness of 3.5 μm in which the liquid crystal composition had been injected at a frequency of 0.05 Hz)

Burn-In:

The liquid crystal display element was evaluated in terms of burn-in in the following manner. A predetermined fixed pattern was displayed in a displaying area for 1000 hours. Subsequently, uniform display over the entire screen was performed, and the level of a residual image of the fixed pattern was visually inspected and rated on the following four-point scale.

Excellent: A residual image was absent.

Good: A slight residual image was present, but at an acceptable level.

Poor: A residual image was present at an unacceptable level.

Failure: A strong residual image was present.

The following abbreviations are used to describe compounds.

(Ring Structure)

[Chem. 23]

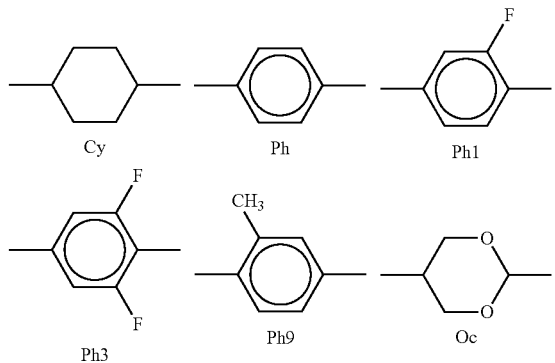

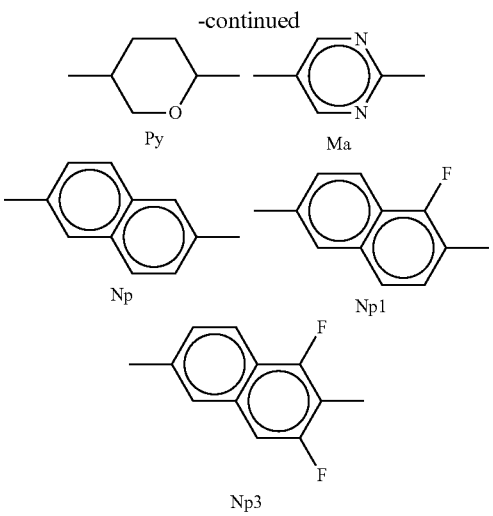

(Structures of Side-Chain and Linkage)

TABLE 8

| n (numeral) at the end | $C_nH_{2n+1}$— |
|---|---|
| -2- | —$CH_2CH_2$— |
| —1O— | —$CH_2O$— |
| —O1- | —$OCH_2$— |
| —V— | —CO— |
| —VO— | —COO— |
| —CFFO— | —$CF_2O$— |
| —F | —F |
| —Cl | —Cl |
| —CN | —C≡N |
| —OCFFF | —$OCF_3$ |
| —CFFF | —$CF_3$ |
| —On | —$OC_nH_{2n+1}$— |
| -T- | —C≡C— |
| —N— | —CH=N—N=CH— |
| ndm- | $C_nH_{2n+1}$—HC=CH—$(CH_2)_{m-1}$— |
| -ndm | —$(CH_2)_{n-1}$—HC=CH—$C_mH_{2m+1}$ |
| ndmO— | $C_nH_{2n+1}$—HC=CH—$(CH_2)_{m-1}$O— |
| —Ondm | —O—$(CH_2)_{n-1}$—HC=CH—$C_mH_{2m+1}$ |
| -ndm- | —$(CH_2)_{n-1}$—HC=CH—$(CH_2)_{m-1}$— |

[Preparation of Color Filters]
[Preparation of Black Matrices]
[Black Matrix 1]

In 45 parts of a dispersant solution, 55 parts of a carbon black (C.I. Pigment Black 7) having a volume resistivity of 10$^7$ Ω·cm was dispersed using a paint conditioner to prepare a dispersion of the carbon black. With 67 parts of the dispersion, 2 parts of a photopolymerizable monomer for ultraviolet curing, 7 parts of an alkali-soluble resin, 1 part of a photo initiator, and 23 parts of a solvent were mixed. Thus, a photosensitive composition 1 for black matrices was prepared.

The photosensitive composition 1 was applied to a glass substrate using a spin coater. The glass substrate was dried in vacuum for 1 minute and subsequently dried by being heated at 90° C. on a hot plate for 90 seconds. Thus, a dried coating film having a thickness of about 3 μm was formed. Subsequently, a surface of the glass substrate on which the coating film was deposited was exposed to light through a pattern mask so as to form an image. Then, development was performed. Thus, a black matrix 1 was prepared.

[Black Matrix 2]

In 30 parts of a dispersant solution, 70 parts of a titanium black (C.I. Pigment Black 35) having a volume resistivity of 10$^6$ Ω·cm was dispersed using a paint conditioner to prepare a dispersion of the titanium black. With 16 parts of the dispersion, 66 parts of a photopolymerizable monomer for ultraviolet curing, 16 parts of an alkali-soluble resin, 2 parts of a photo initiator, and 16 parts of a solvent were mixed. Thus, a photosensitive composition 2 for black matrices was prepared.

The photosensitive composition 2 was applied to a glass substrate using a spin coater. The glass substrate was dried in vacuum for 1 minute and subsequently dried by being heated at 90° C. on a hot plate for 90 seconds. Thus, a dried coating film having a thickness of about 3 μm was formed. Subsequently, a surface of the glass substrate on which the coating film was deposited was exposed to light through a pattern mask so as to form an image. Then, development was performed. Thus, a black matrix 2 was prepared.

[Black Matrix 3]

In 85 parts of a dispersant solution, 5 parts of a blue organic pigment (C.I. Pigment Blue 60) having a volume resistivity of $10^{10}$ Ω·cm, 2 parts of a purple organic pigment (C.I. Pigment Violet 23) having a volume resistivity of $10^9$ Ω·cm, 4 parts of a green organic pigment (C.I. Pigment Green 7) having a volume resistivity of $10^{13}$ Ω·cm, and 4 parts of a red organic pigment (C.I. Pigment Red 179) having a volume resistivity of $10^9$ Ω·cm were dispersed using a paint conditioner to prepare a black dispersion of the organic pigments. With 40 parts of the dispersion, 4 parts of a photopolymerizable monomer for ultraviolet curing, 2 parts of an alkali-soluble resin, 1 part of a photo initiator, and 53 parts of a solvent were mixed. Thus, a photosensitive composition 3 for black matrices was prepared.

The photosensitive composition 3 was applied to a glass substrate using a spin coater. The glass substrate was dried in vacuum for 1 minute and subsequently dried by being heated at 90° C. on a hot plate for 90 seconds. Thus, a dried coating film having a thickness of about 3 μm was formed. Subsequently, a surface of the glass substrate on which the coating film was deposited was exposed to light through a pattern mask so as to form an image. Then, development was performed. Thus, a black matrix 3 was prepared.

In 85 parts of a dispersant solution, 6 parts of a blue organic pigment (C.I. Pigment Blue 15:6) having a volume resistivity of $10^9$ Ω·cm, 4 parts of a red organic pigment (C.I. Pigment Red 254) having a volume resistivity of $10^{10}$ Ω·cm, and 5 parts of a yellow organic pigment (C.I. Pigment Yellow 150) having a volume resistivity of $10^9$ Ω·cm were dispersed using a paint conditioner to prepare a black dispersion of the organic pigments. With 40 parts of the dispersion, 4 parts of a photopolymerizable monomer for ultraviolet curing, 2 parts of an alkali-soluble resin, 1 part of a photo initiator, and 53 parts of a solvent were mixed. Thus, a photosensitive composition 4 for black matrices was prepared.

The photosensitive composition 4 was applied to a glass substrate using a spin coater. The glass substrate was dried in vacuum for 1 minute and subsequently dried by being heated at 90° C. on a hot plate for 90 seconds. Thus, a dried coating film having a thickness of about 3 μm was formed. Subsequently, a surface of the glass substrate on which the coating film was deposited was exposed to light through a pattern mask so as to form an image. Then, development was performed. Thus, a black matrix 4 was prepared.

[Black Matrix 5]

A chromium oxide film was deposited on a glass substrate by sputtering. A photoresist pattern, which was used for forming openings by photolithography, was formed on the chromium oxide film. Portions of the chromium oxide film which were exposed through the photoresist pattern were removed by etching. Subsequently, the photoresist pattern was removed. Thus, a black matrix 5 was prepared.

[Preparation of Coloring Compositions for RGB Three-Color Pixel Portion]

[Red Dye Coloring Composition 1]

Into a plastic bottle, 10 parts of a red pigment 1 (C.I. Pigment Red 254, "IRGAPHOR RED BT-CF" produced by BASF) was charged. To the plastic bottle, 55 parts of propylene glycol monomethyl ether acetate, 7.0 parts of DISPERBYK LPN21116 (produced by BYK-Chemie), and 0.3-to-0.4-mmϕ SEPR beads were added. These components were dispersed for 4 hours using a paint conditioner (produced by Toyo Seiki Kogyo Co., Ltd.). The resulting mixture was filtered through a 5-μm filter to prepare a pigment dispersion. Then, 75.00 parts of the pigment dispersion was mixed with 5.50 parts of a polyester acrylate resin (ARONIX (trade name) M7100, produced by TOAGOSEI CO., LTD.), 5.00 parts of dipentaerythritol hexaacrylate (KAYARAD (trade name) DPHA, produced by Nippon Kayaku Co., Ltd.), 1.00 parts of benzophenone (KAYA-CURE (trade name) BP-100, produced by Nippon Kayaku Co., Ltd.), and 13.5 parts of UCAR ester EEP under stirring using a dispersion stirrer. The resulting mixture was filtered through a filter having a pore size of 1.0 μm. Thus, a red pigment coloring composition 1 was prepared.

[Green Pigment Coloring Composition 1]

A green pigment coloring composition 1 was prepared as described above, except that 6 parts of a green pigment 1 (C.I. Pigment Green 58, "FASTOGEN GREEN A110" produced by DIC Corporation) and 4 parts of a yellow pigment 1 (C.I. Pigment Yellow 150, "FANCHON FAST YELLOW E4GN" produced by LANXESS) were used instead of 10 parts of the red pigment 1 used for preparing the red pigment coloring composition 1 described above.

[Blue Pigment Coloring Composition 1]

A blue pigment coloring composition 1 was prepared as described above, except that 9 parts of a blue pigment 1 (C.I. Pigment Blue 15:6, "FASTOGEN BLUE EP-210" produced by DIC Corporation) and 1 part of a purple pigment 1 (C.I. Pigment VIOLET 23) were used instead of 10 parts of the red pigment 1 used for preparing the red pigment coloring composition 1 described above.

[Preparation of Color Filters]

To a glass substrate on which a black matrix had been deposited, the red coloring composition 1 was applied by spin coating so as to form a coating film having a thickness of 2 μm. After being dried at 70° C. for 20 minutes, the coating film was exposed to ultraviolet rays through a photomask using an exposure machine including an extra-high pressure mercury lamp to form a striped pattern in the coating film. The patterned coating film was subjected to spray development using an alkali developing solution for 90 seconds, then washed with ion-exchanged water, and air-dried. Subsequently, post-baking was performed in a clean oven at 230° C. for 30 minutes. Thus, red pixels, that is, a colored layer having a striped pattern, was formed on the transparent substrate.

In the same manner, the green coloring composition 1 was applied to the glass substrate by spin coating so as to form a coating film having a thickness of 2 μm. After being dried, the coating film was exposed to light using the exposure machine such that a colored layer having a striped pattern was developed at a position displaced from that of the red pixels. Thus, green pixels adjacent to the red pixels were formed.

In the same manner, the blue coloring composition 1 was applied to the glass substrate by spin coating so as to form a coating film having a thickness of 2 μm. Thus, blue pixels adjacent to the red pixels and the green pixels were formed. In the above-described manner, a color filter including three-colored pixels of red, green, and blue having a striped pattern, which were formed on the transparent substrate, was prepared.

Color filters 1 to 4 and a comparative color filter 1 were prepared using the black matrices shown in Table 9.

second substrates which faced each other. Subsequently, the alignment films were subjected to a weak rubbing treatment. Thus, an IPS cell was formed. The liquid crystal composition 1 described below was held between the first and second substrates. Table 10 summarizes the physical properties of the liquid crystal composition 1. Then, liquid crystal display devices of Examples 1 to 4 ($d_{gap}$=4.0 μm, alignment film:

TABLE 9

|  | Color filter 1 | Color filter 2 | Color filter 3 | Color filter 4 | Comparative color filter 1 |
| --- | --- | --- | --- | --- | --- |
| Black matrix | Black matrix 1 | Black matrix 2 | Black matrix 3 | Black matrix 4 | Black matrix 5 |

Examples 1 to 4

An electrode structure was formed on at least one of the first and second substrates, and an alignment film having a horizontal alignment was formed on surfaces of the first and AL-1051) were each prepared using a specific one of the color filters 1 to 4 shown in Table 9. The VHR and ID of each liquid crystal display device were measured. Each liquid crystal display device was evaluated in terms of burn-in. Table 11 summarizes the results.

[Chem. 24]

| Chemical structure | Proportion | Abbreviation |
| --- | --- | --- |
| $C_3H_7$–Cy–Cy–CH=CH$_2$ | 48% | 3-Cy-Cy-1d0 |
| $C_3H_7$–Cy–Cy–CH=CH–CH$_3$ | 4% | 3-Cy-Cy-1d1 |
| $H_3C$–Ph–Ph–CH$_2$–CH=CH–CH$_3$ | 8% | 1-Ph—Ph-3d1 |
| $C_3H_7$–Cy–Ph–Ph–$C_2H_5$ | 5% | 3-Cy-Ph—Ph-2 |
| $C_2H_5$–Ph–Ph(F)–Ph–$C_3H_7$ | 5% | 2-Ph—Ph1—Ph-3 |
| $C_3H_7$–Ph–Ph(F,F)–CF$_2$O–Ph(F,F)–F | 2% | 3-Ph—Ph3—CFFO—Ph3—F |
| $C_3H_7$–Cy–Cy–CF$_2$O–Ph(F,F,F)–F | 3% | 3-Cy-Cy-CFFO—Ph3—F |

-continued

[Chem. 24]

| Chemical structure | Proportion | Abbreviation |
|---|---|---|
| 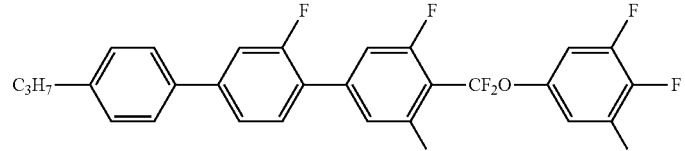 | 7% | 3-Ph—Ph1—Ph3—CFFO—Ph3—F |
| 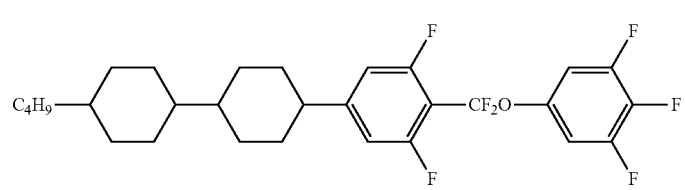 | 5% | 4-Cy-Cy-Ph3—CFFO—Ph3—F |

TABLE 10

| | |
|---|---|
| $T_{NI}/°$ C. | 75.8 |
| Δn | 0.112 |
| no | 1.488 |
| $\epsilon_\perp$ | 5.5 |
| Δε | 2.9 |
| η/mPa · s | 13.5 |

TABLE 11

| | Example 1 | Example 2 | Example 3 | Example 4 |
|---|---|---|---|---|
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 99.6 | 99.4 | 99.2 | 99.1 |
| ID | 14 | 24 | 61 | 75 |
| Burn-in | Excellent | Excellent | Good | Good |

The liquid crystal composition 1 had a liquid crystal layer temperature range of 75.8° C., which is at a practical level as a liquid crystal composition for TV, a dielectric anisotropy having a large absolute value, a low viscosity, and an optimal Δn.

The liquid crystal display devices of Examples 1 to 4 had a high VHR and a small ID. Furthermore, a residual image was absent in the burn-in evaluation. Even when a residual image was present, it was very slight and at an acceptable level.

Examples 5 to 12

The liquid crystal composition 2 or 3 shown in Table 12 was held between the substrates as in Example 1. Then, liquid crystal display devices of Examples 5 to 12 were each prepared using a specific one of the color filters shown in Table 9. The VHR and ID of each liquid crystal display device were measured. Each liquid crystal display device was evaluated in terms of burn-in. Tables 13 and 14 summarize the results.

TABLE 12

| Name of compound | Content (%) |
|---|---|
| Liquid crystal composition 2 | |
| 4-Cy-Cy-1d0 | 15 |
| 0d1-Cy-Cy-Ph-1 | 4 |
| 0d3-Cy-Cy-Ph-1 | 14 |
| 3-Cy-Ph—Ph-Cy-3 | 3 |
| 3-Cy-Ph—Ph1-Cy-3 | 4 |
| 1-Cy-Cy-Ph3—F | 9 |
| 2-Cy-Ph—Ph3—F | 10 |
| 3-Cy-Ph—Ph3—F | 10 |
| 5-Cy-Ph—Ph3—F | 5 |
| 0d1-Cy-Cy-Ph1—F | 8 |
| 3-Cy-Cy-Ph1—Ph3—F | 8 |
| 2-Ph—Ph3—CFFO—Ph3—F | 4 |
| 3-Ph—Ph3—CFFO—Ph3—F | 6 |
| Tni/° C. | 100.7 |
| Δn | 0.094 |
| Δε | 8.0 |
| γ1/mPa · s | 108 |
| η/mPa · s | 22.2 |
| Liquid crystal composition 3 | |
| 5-Cy-Cy-1d0 | 5 |
| 3-Cy-Cy-1d1 | 10 |
| 0d1-Cy-Cy-Ph-1 | 8 |
| 5-Cy-Cy-Ph—O1 | 6 |
| 2-Ph—Ph1—Ph-3 | 8 |
| 2-Cy-Cy-Ph3—F | 11 |
| 3-Cy-Cy-Ph3—F | 15 |
| 5-Cy-Cy-Ph3—F | 5 |
| 3-Cy-Ph—Ph3—F | 6 |
| 3-Cy-Ph—Ph1—F | 9 |
| 4-Cy-Cy-Ph—OCFFF | 4 |
| 3-Cy-Cy-CFFO—Ph3—F | 7 |
| 5-Cy-Cy-CFFO—Ph3—F | 4 |
| 3-Cy-Cy-Ph1—Ph3—F | 2 |
| Tni/° C. | 103.2 |
| Δn | 0.102 |
| Δε | 7.1 |
| γ1/mPa · s | 96 |
| η/mPa · s | 20.8 |

TABLE 13

|  | Example 5 | Example 6 | Example 7 | Example 8 |
|---|---|---|---|---|
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.5 | 99.4 | 99.1 | 99.0 |
| ID | 17 | 26 | 68 | 79 |
| Burn-in | Excellent | Excellent | Excellent | Good |

TABLE 14

|  | Example 9 | Example 10 | Example 11 | Example 12 |
|---|---|---|---|---|
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.5 | 99.3 | 99.2 | 99.0 |
| ID | 18 | 46 | 65 | 81 |
| Burn-in | Excellent | Excellent | Excellent | Good |

The liquid crystal display devices of Examples 5 to 12 had a high VHR and a small ID. Furthermore, a residual image was absent in the burn-in evaluation. Even when a residual image was present, it was very slight and at an acceptable level.

Examples 13 to 24

A specific one of the liquid crystal compositions 4 to 6 shown in Table 15 was held between the substrates as in Example 1. Then, liquid crystal display devices of Examples 13 to 24 were each prepared using a specific one of the color filters shown in Table 9. The VHR and ID of each liquid crystal display device were measured. Each liquid crystal display device was evaluated in terms of burn-in. Tables 16 to 18 summarize the results.

TABLE 15

| Name of compound | Content (%) |
|---|---|
| Liquid crystal composition 4 | |
| 5-Cy-Cy-1d0 | 15 |
| 3-Cy-Cy-1d1 | 2 |
| 0d1-Cy-Cy-Ph-1 | 12 |
| 2-Ph—Ph1—Ph-3 | 3 |
| 2-Ph—Ph1—Ph-4 | 3 |
| 2-Cy-Cy-Ph3—F | 8 |
| 2-Cy-Ph—Ph3—F | 3 |
| 3-Cy-Ph—Ph3—F | 9 |
| 4-Cy-Cy-Ph—OCFFF | 14 |
| 3-Ph—Ph3—CFFO—Ph3—F | 11 |
| 2-Cy-Cy-CFFO—Ph3—F | 9 |
| 3-Cy-Cy-CFFO—Ph3—F | 8 |
| 3-Cy-Cy-Ph1—Ph3—F | 3 |
| Tni/° C. | 90.2 |
| Δn | 0.098 |
| Δε | 9.1 |
| γ1/mPa · s | 90 |
| η/mPa · s | 18.1 |
| Liquid crystal composition 5 | |
| 5-Cy-Cy-1d0 | 10 |
| 3-Cy-Cy-1d1 | 5 |
| 0d1-Cy-Cy-Ph-1 | 8 |
| 0d3-Cy-Cy-Ph-1 | 12 |
| 2-Ph—Ph1—Ph-5 | 2 |
| 3-Cy-Ph—Ph-Cy-3 | 3 |
| 3-Cy-Ph—Ph1-Cy-3 | 3 |
| 1-Cy-Cy-Ph3—F | 9 |
| 2-Cy-Cy-Ph3—F | 10 |
| 3-Cy-Cy-Ph3—F | 6 |
| 5-Cy-Cy-Ph3—F | 5 |
| 0d1-Cy-Cy-Ph1—F | 8 |
| 2-Ph—Ph3—CFFO—Ph3—F | 4 |
| 3-Ph—Ph3—CFFO—Ph3—F | 6 |
| 3-Cy-Cy-Ph1—Ph3—F | 9 |
| Tni/° C. | 110.0 |
| Δn | 0.099 |
| Δε | 8.3 |
| γ1/mPa · s | 112 |
| η/mPa · s | 23.4 |
| Liquid crystal composition 6 | |
| 5-Cy-Cy-1d0 | 12 |
| 3-Cy-Cy-1d1 | 25 |
| 3-Cy-Cy-1d1 | 12 |
| 0d1-Cy-Cy-Ph-1 | 4 |
| 0d3-Cy-Cy-Ph-1 | 9 |
| 2-Ph—Ph1—Ph3—F | 5 |
| 3-Ph—Ph1—Ph3—F | 9 |
| 2-Ph—Ph3—CFFO—Ph3—F | 4 |
| 3-Ph—Ph3—CFFO—Ph3—F | 6 |
| 3-Cy-Cy-CFFO—Ph3—F | 2 |
| 5-Cy-Cy-CFFO—Ph3—F | 3 |
| 3-Cy-Cy-Ph1—Ph3—F | 9 |
| Tni/° C. | 77.4 |
| Δn | 0.101 |
| Δε | 7.0 |
| γ1/mPa · s | 86 |
| η/mPa · s | 14.2 |

TABLE 16

|  | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.6 | 99.5 | 99.3 | 99.1 |
| ID | 13 | 20 | 43 | 72 |
| Burn-in | Excellent | Excellent | Excellent | Good |

TABLE 17

|  | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |

TABLE 17-continued

|  | Example 17 | Example 18 | Example 19 | Example 20 |
|---|---|---|---|---|
| Color filter | Color filter 1 | Color filter 2 | Color filter 3 | Color filter 4 |
| VHR | 99.4 | 99.3 | 99.1 | 99.0 |
| ID | 27 | 44 | 70 | 84 |
| Burn-in | Excellent | Excellent | Good | Good |

TABLE 18

|  | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.5 | 99.3 | 99.1 | 99.1 |
| ID | 19 | 42 | 69 | 74 |
| Burn-in | Excellent | Excellent | Excellent | Good |

The liquid crystal display devices of Examples 13 to 24 had a high VHR and a small ID. Furthermore, a residual image was absent in the burn-in evaluation. Even when a residual image was present, it was very slight and at an acceptable level.

Examples 25 to 36

An electrode structure was formed on the first and second substrates, and an alignment film having a horizontal alignment was formed on surfaces of the first and second substrates which faced each other. The alignment films were subjected to a weak rubbing treatment. Thus, a TN cell was prepared. Subsequently, a specific one of the liquid crystal compositions 7 to 9 shown in Table 19 was held between the first and second substrates. Then, liquid crystal display devices of Examples 25 to 36 ($d_{gap}$=3.5 μm, alignment film: SE-7492) were each prepared using a specific one of the color filters 1 to 4 shown in Table 9. The VHR and ID of each liquid crystal display device were measured. Each liquid crystal display device was evaluated in terms of burn-in. Tables 20 to 22 summarize the results.

TABLE 19

| Name of compound | Content (%) |
|---|---|
| Liquid crystal composition 7 | |
| 3-Cy-Cy-1d0 | 38 |
| 3-Cy-Cy-1d1 | 9 |
| 0d1-Cy-Cy-Ph-1 | 16 |
| 0d3-Cy-Cy-Ph-1 | 4 |
| 2-Ph—Ph3—CFFO—Ph3—F | 2 |
| 3-Ph—Ph3—CFFO—Ph3—F | 12 |
| 3-Cy-Cy-CFFO—Ph3—F | 7 |
| 3-Ph—Ph—Ph1—Ph3—F | 1 |
| 3-Ph—Ph1—Ph3—CFFO—Ph3—F | 2 |
| 2-Py-Ph—Ph3—CFFO—Ph3—F | 9 |
| Tni/° C. | 76.0 |
| Δn | 0.097 |
| Δε | 6.8 |
| γ1/mPa · s | 83 |
| η/mPa · s | 14.5 |

TABLE 19-continued

| Name of compound | Content (%) |
|---|---|
| Liquid crystal composition 8 | |
| 3-Cy-Cy-1d0 | 38 |
| 3-Cy-Cy-1d1 | 14 |
| 0d3-Cy-Cy-Ph-1 | 8 |
| 3-Ph—Ph3—CFFO—Ph3—F | 9 |
| 3-Cy-Cy-CFFO—Ph3—F | 15 |
| 3-Ph—Ph1—Ph3—CFFO—Ph3—F | 2 |
| 4-Ph—Ph1—Ph3—CFFO—Ph3—F | 7 |
| 5-Ph—Ph1—Ph3—CFFO—Ph3—F | 7 |
| Tni/° C. | 81.8 |
| Δn | 0.099 |
| Δε | 8.0 |
| γ1/mPa · s | 83 |
| η/mPa · s | 14.6 |
| Liquid crystal composition 9 | |
| 3-Cy-Cy-1d0 | 30 |
| 3-Cy-Cy-1d1 | 17 |
| 0d1-Cy-Cy-Ph-1 | 7 |
| 0d3-Cy-Cy-Ph-1 | 7 |
| 3-Cy-Cy-Ph-2 | 2 |
| 2-Ph—Ph1—Ph-4 | 2 |
| 2-Ph—Ph1—Ph3—F | 8 |
| 3-Ph—Ph1—Ph3—F | 12 |
| 3-Ph—Ph3—Ph3—F | 4 |
| 3-Cy-Cy-Ph1—CFFO—Ph3—F | 11 |
| Tni/° C. | 75.0 |
| Δn | 0.112 |
| Δε | 8.7 |
| γ1/mPa · s | 87 |
| η/mPa · s | 15.2 |

TABLE 20

|  | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.6 | 99.4 | 99.2 | 99.0 |
| ID | 15 | 25 | 66 | 88 |
| Burn-in | Excellent | Excellent | Excellent | Good |

TABLE 21

|  | Example 29 | Example 30 | Example 31 | Example 32 |
| --- | --- | --- | --- | --- |
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 99.7 | 99.5 | 99.3 | 99.1 |
| ID | 13 | 20 | 48 | 71 |
| Burn-in | Excellent | Excellent | Excellent | Excellent |

TABLE 22

|  | Example 33 | Example 34 | Example 35 | Example 36 |
| --- | --- | --- | --- | --- |
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.5 | 99.4 | 99.2 | 99.0 |
| ID | 22 | 29 | 66 | 87 |
| Burn-in | Excellent | Excellent | Excellent | Good |

The liquid crystal display devices of Examples 25 to 36 had a high VHR and a small ID. Furthermore, a residual image was absent in the burn-in evaluation. Even when a residual image was present, it was very slight and at an acceptable level.

Examples 37 to 44

An electrode structure was formed on at least one of the first and second substrates, and an alignment film having a horizontal alignment was formed on surfaces of the first and second substrates which faced each other. The alignment films were subjected to a weak rubbing treatment. Thus, an FFS cell was prepared. The liquid crystal composition 10 or 11 shown in Table 23 was held between the first and second substrates. Then, liquid crystal display devices of Examples 37 to 44 ($d_{gap}$=4.0 μm, alignment film: AL-1051) were each prepared using a specific one of the color filters 1 to 4 shown in Table 9. The VHR and ID of each liquid crystal display device were measured. Each liquid crystal display device was evaluated in terms of burn-in. Tables 24 and 25 summarize the results.

TABLE 23

| Name of compound | Content (%) |
| --- | --- |
| Liquid crystal composition 10 | |
| 3-Cy-Cy-1d0 | 39 |
| 3-Cy-Cy-1d1 | 7 |
| 0d1-Cy-Cy-Ph-1 | 11 |
| 2-Ph—Ph1—Ph-3 | 8 |
| 2-Ph—Ph1—Ph-5 | 8 |
| 3-Ph—Ph3—CFFO—Ph3—F | 10 |
| 3-Cy-Cy-Ph—Ph3—F | 6 |
| 4-Ph—Ph1—Ph3—CFFO—Ph3—F | 11 |
| Tni/° C. | 76.0 |
| Δn | 0.114 |
| Δε | 6.0 |
| γ1/mPa · s | 77 |
| η/mPa · s | 13.3 |

TABLE 23-continued

| Name of compound | Content (%) |
| --- | --- |
| Liquid crystal composition 11 | |
| 3-Cy-Cy-1d0 | 44 |
| 3-Cy-Cy-1d1 | 3 |
| 2-Ph—Ph-3d1 | 13 |
| 3-Cy-Ph—Ph-2 | 7 |
| 2-Ph—Ph1—Ph-3 | 8 |
| 3-Ph—Ph1—Ph-3 | 7 |
| 3-Ph—Ph1—Ph3—CFFO—Ph3—F | 9 |
| 4-Cy-Cy-Ph1—CFFO—Ph3—F | 3 |
| 3-Cy-Ph3—Ph1—OCFFF | 6 |
| Tni/° C. | 77.9 |
| Δn | 0.131 |
| Δε | 4.6 |
| γ1/mPa · s | 74 |
| η/mPa · s | 12.4 |

TABLE 24

|  | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 99.5 | 99.3 | 99.2 | 99.0 |
| ID | 23 | 45 | 68 | 85 |
| Burn-in | Excellent | Excellent | Excellent | Good |

TABLE 25

|  | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.6 | 99.4 | 99.3 | 99.1 |
| ID | 16 | 28 | 49 | 78 |
| Burn-in | Excellent | Excellent | Excellent | Excellent |

The liquid crystal display devices of Examples 37 to 44 had a high VHR and a small ID. Furthermore, a residual image was absent in the burn-in evaluation. Even when a residual image was present, it was very slight and at an acceptable level.

Examples 45 to 56

A specific one of the liquid crystal compositions 12 to 14 shown in Table 26 was held between the substrates as in Example 37. Then, liquid crystal display devices of Examples 45 to 56 were each prepared using a specific one of the color filters shown in Table 9. The VHR and ID of each liquid crystal display device were measured. Each liquid crystal display device was evaluated in terms of burn-in. Tables 27 to 29 summarize the results.

TABLE 26

| Name of compound | Content (%) |
|---|---|
| Liquid crystal composition 12 | |
| 3-Cy-Cy-1d0 | 47 |
| 3-Cy-Cy-1d1 | 9 |
| 3-Cy-Cy-Ph-2 | 7 |
| 2-Ph—Ph1—Ph-3 | 4 |
| 2-Ph—Ph1—Ph-5 | 7 |
| 3-Cy-Ph—Ph-Cy-3 | 2 |
| 2-Ph—Ph1—Ph-3 | 6 |
| 3-Ph—Ph1—Ph-3 | 7 |
| 3-Ph—Ph3—CFFO—Ph3—F | 2 |
| 3-Cy-Cy-Ph1—Ph3—F | 2 |
| 3-Cy-Ph—Ph3—Ph1—OCFFF | 7 |
| Tni/° C. | 80.6 |
| Δn | 0.122 |
| Δε | 6.0 |
| γ1/mPa · s | 65 |
| η/mPa · s | 11.1 |
| Liquid crystal composition 13 | |
| 3-Cy-Cy-1d0 | 29 |
| 5-Cy-Cy-1d1 | 8 |
| 3-Cy-Cy-1d1 | 13 |
| 5-Ph—Ph-1 | 2 |
| 2-Ph—Ph1—Ph-3 | 6 |

TABLE 26-continued

| Name of compound | Content (%) |
|---|---|
| 2-Ph—Ph1—Ph-4 | 6 |
| 2-Ph—Ph1—Ph-5 | 6 |
| 3-Cy-Ph—Ph-Cy-3 | 4 |
| 3-Ph—Ph1—Ph3—F | 9 |
| 2-Ph—Ph3—Ph3—F | 7 |
| 3-Ph—Ph3—CFFO—Ph3—F | 4 |
| 3-Cy-Ph—Cl | 3 |
| 3-Cy-Cy-Ph1—Ph3—F | 3 |
| Tni/° C. | 74.9 |
| Δn | 0.121 |
| Δε | 4.1 |
| γ1/mPa · s | 60 |
| η/mPa · s | 10.8 |
| Liquid crystal composition 14 | |
| 3-Cy-Cy-1d0 | 10 |
| 3-Cy-Cy-1d1 | 6 |
| 3-Cy-Cy-1d1-F | 28 |
| 0d1-Cy-Cy-Ph-1 | 11 |
| 0d3-Cy-Cy-Ph-1 | 10 |
| 2-Ph—Ph1—Ph-3 | 10 |
| 2-Ph—Ph1—Ph-5 | 10 |
| 5-Cy-Ph—Ph1—Ph-2 | 2 |
| 3-Ph—Ph3—CFFO—Ph3—F | 7 |
| 3-Cy-Cy-Ph1—CFFO—Ph3—F | 6 |
| Tni/° C. | 80.0 |
| Δn | 0.110 |
| Δε | 5.9 |
| γ1/mPa · s | 68 |
| η/mPa · s | 11.6 |

TABLE 27

|  | Example 45 | Example 46 | Example 47 | Example 48 |
|---|---|---|---|---|
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.7 | 99.5 | 99.3 | 99.2 |
| ID | 14 | 22 | 46 | 67 |
| Burn-in | Excellent | Excellent | Excellent | Excellent |

TABLE 28

|  | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.5 | 99.4 | 99.3 | 99.1 |
| ID | 22 | 30 | 44 | 77 |
| Burn-in | Excellent | Excellent | Excellent | Good |

TABLE 29

|  | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 99.6 | 99.4 | 99.1 | 99.0 |
| ID | 14 | 29 | 68 | 84 |
| Burn-in | Excellent | Excellent | Good | Good |

The liquid crystal display devices of Examples 45 to 56 had a high VHR and a small ID. Furthermore, a residual image was absent in the burn-in evaluation. Even when a residual image was present, it was very slight and at an acceptable level.

Examples 57 to 60

A liquid crystal composition 15 was prepared by mixing the liquid crystal composition 10 used in Example 37 with 0.3% by mass of bismethacrylic acid biphenyl-4,4'-diyl ester. The liquid crystal composition 15 was held inside a TN cell. While a driving voltage was applied between the electrodes, ultraviolet irradiation (3.0 J/cm$^2$) was done for 600 seconds to perform a polymerization treatment. Subsequently, liquid crystal display devices of Examples 57 to 60 were each prepared using a specific one of the color filters 1 to 4 shown in Table 9. The VHR and ID of each liquid crystal display device were measured. Each liquid crystal display device was evaluated in terms of burn-in. Table 30 summarizes the results.

The liquid crystal display devices of Examples 57 to 60 had a high VHR and a small ID. Furthermore, a residual image was absent in the burn-in evaluation. Even when a residual image was present, it was very slight and at an acceptable level.

Examples 61 to 64

A liquid crystal composition 16 was prepared by mixing the liquid crystal composition 8 used in Example 29 with 0.3% by mass of bismethacrylic acid biphenyl-4,4'-diyl ester. The liquid crystal composition 16 was held inside an IPS cell. While a driving voltage was applied between the electrodes, ultraviolet irradiation (3.0 J/cm$^2$) was done for 600 seconds to perform a polymerization treatment. Subsequently, liquid crystal display devices of Examples 61 to 64 were each prepared using a specific one of the color filters 1 to 4 shown in Table 9. The VHR and ID of each liquid crystal display device were measured. Each liquid crystal display device was evaluated in terms of burn-in. Table 31 summarizes the results.

TABLE 30

|  | Example 57 | Example 58 | Example 59 | Example 60 |
|---|---|---|---|---|
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.5 | 99.4 | 99.2 | 99.1 |
| ID | 20 | 27 | 66 | 76 |
| Burn-in | Excellent | Excellent | Excellent | Good |

TABLE 31

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.4 | 99.3 | 99.1 | 99.0 |
| ID | 31 | 45 | 72 | 90 |
| Burn-in | Excellent | Excellent | Good | Good |

The liquid crystal display devices of Examples 61 to 64 had a high VHR and a small ID. Furthermore, a residual image was absent in the burn-in evaluation. Even when a residual image was present, it was very slight and at an acceptable level.

Examples 65 to 68

A liquid crystal composition 17 was prepared by mixing the liquid crystal composition 6 used in Example 21 with 0.3% by mass of bismethacrylic acid 3-fluorobiphenyl-4,4'-diyl ester. The liquid crystal composition 17 was held inside an FFS cell. While a driving voltage was applied between the electrodes, ultraviolet irradiation (3.0 J/cm$^2$) was done for 600 seconds to perform a polymerization treatment. Subsequently, liquid crystal display devices of Examples 65 to 68 were each prepared using a specific one of the color filters 1 to 4 shown in Table 9. The VHR and ID of each liquid crystal display device were measured. Each liquid crystal display device was evaluated in terms of burn-in. Table 32 summarizes the results.

TABLE 32

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.6 | 99.4 | 99.2 | 99.0 |
| ID | 15 | 27 | 63 | 86 |
| Burn-in | Excellent | Excellent | Excellent | Good |

The liquid crystal display devices of Examples 65 to 68 had a high VHR and a small ID. Furthermore, a residual image was absent in the burn-in evaluation. Even when a residual image was present, it was very slight and at an acceptable level.

Comparative Examples 1 to 4

The comparative liquid crystal composition 1 described below was held inside the IPS cell used in Example 1. Table 33 summarizes the physical properties of the comparative liquid crystal composition. Liquid crystal display devices of Comparative Examples 1 to 4 were each prepared using a specific one of the color filters 1 to 4 shown in Table 9. The VHR and ID of each liquid crystal display device were measured. Each liquid crystal display device was evaluated in terms of burn-in. Table 34 summarizes the results.

[Chem. 25]

| Chemical structure | Proportion | Abbreviation |
|---|---|---|
| $C_4H_9$—⬡—COO—⬡—$CH_3$ | 27% | 4-Cy-VO—Ph-1 |
| $C_5H_{11}$—⬡—COO—⬡—$CH_3$ | 20% | 5-Cy-VO—Ph-1 |
| $C_5H_{11}$—⬡—COO—⬡—$C_3H_7$ | 20% | 5-Cy-VO—Ph-3 |

[Chem. 25]

| Chemical structure | Proportion | Abbreviation |
|---|---|---|
| C₃H₇–[Ph(F,F)]–[Ph(F,F)]–CF₂O–[Ph(F,F)]–F | 8% | 3-Ph—Ph3—CFFO—Ph3—F |
| C₃H₇–[Cy]–[Cy]–CF₂O–[Ph(F,F,F)]–F | 13% | 3-Cy-Cy-CFFO—Ph3—F |
| C₃H₇–[Ph]–[Ph(F)]–[Ph(F,F)]–CF₂O–[Ph(F,F)]–F | 12% | 3-Ph—Ph1—Ph3—CFFO—Ph3—F |

TABLE 33

| | |
|---|---|
| $T_{NI}/°C$ | 69.3 |
| $\Delta n$ | 0.096 |
| $n_o$ | 1.484 |
| $\epsilon_\perp$ | 5.5 |
| $\Delta\epsilon$ | 4.8 |
| $\eta/mPa \cdot s$ | 30.3 |

TABLE 34

| | Comparative example 1 | Comparative example 2 | Comparative example 3 | Comparative example 4 |
|---|---|---|---|---|
| Liquid crystal composition | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 98.2 | 98.0 | 97.9 | 97.8 |
| ID | 162 | 177 | 188 | 199 |
| Burn-in | Failure | Failure | Failure | Failure |

The liquid crystal display devices of Comparative Examples 1 to 4 had a lower VHR and a higher ID than the liquid crystal display devices according to the present invention. Furthermore, occurrence of a residual image was observed in the burn-in evaluation, which was not at an acceptable level.

Comparative Examples 5 to 12

The comparative liquid crystal composition 2 or 3 shown in Table 35 was held between the substrates as in Example 1. Then, liquid crystal display devices of Comparative Examples 5 to 12 were prepared using the specific one of the color filters 1 to 4 shown in Table 9. The VHR and ID of the liquid crystal display device were measured. The liquid crystal display device was evaluated in terms of burn-in. Tables 36 and 37 summarize the results.

TABLE 35

| Name of compound | Content (%) |
|---|---|
| Comparative liquid crystal composition 2 | |
| 2-Cy-Cy-Ph3—F | 12 |
| 3-Cy-Cy-Ph3—F | 10 |

TABLE 35-continued

| Name of compound | Content (%) |
|---|---|
| 5-Cy-Cy-Ph3—F | 6 |
| 2-Cy-Cy-Ph—OCFFF | 9 |
| 3-Cy-Cy-Ph—OCFFF | 8 |
| 4-Cy-Cy-Ph—OCFFF | 7 |
| 2-Cy-Ph1—Ph3—F | 12 |
| 3-Cy-Ph1—Ph3—F | 10 |
| 2-Cy-Py-Cy-CFFO—Ph3—F | 5.5 |
| 2-Ph—Ph1—Ph3—F | 5.5 |
| 0d1-Cy-Cy-CFFO—Ph3—F | 15 |
| Tni/°C. | 75.7 |
| $\Delta n$ | 0.093 |
| $\gamma 1/mPa \cdot s$ | 146 |

TABLE 35-continued

| Name of compound | Content (%) |
|---|---|
| Comparative liquid crystal composition 3 | |
| 2-Cy-Cy-Ph3—F | 12 |
| 3-Cy-Cy-Ph3—F | 10 |
| 2-Cy-Cy-Ph—OCFFF | 8 |
| 3-Cy-Cy-Ph—OCFFF | 8 |
| 4-Cy-Cy-Ph—OCFFF | 7 |
| 5-Cy-Cy-Ph—OCFFF | 4 |
| 2-Cy-Ph1—Ph3—F | 12 |
| 3-Cy-Ph1—Ph3—F | 4 |
| 2-Cy-Cy-CFFO—Ph3—F | 12 |
| 2-Ph—Ph1—Ph3—F | 8 |
| 0d1-Cy-Cy-CFFO—Ph3—F | 15 |
| Tni/° C. | 75.0 |
| Δn | 0.093 |
| γ1/mPa · s | 139 |

TABLE 36

| | Comparative example 5 | Comparative example 6 | Comparative example 7 | Comparative example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.3 | 98.3 | 98.1 | 98.0 |
| ID | 152 | 155 | 170 | 184 |
| Burn-in | Failure | Failure | Failure | Failure |

TABLE 37

| | Comparative example 9 | Comparative example 10 | Comparative example 11 | Comparative example 12 |
|---|---|---|---|---|
| Liquid crystal composition | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 |
| VHR | 98.4 | 98.3 | 98.1 | 98.0 |
| ID | 141 | 153 | 167 | 183 |
| Burn-in | Poor | Failure | Failure | Failure |

The liquid crystal display devices of Comparative Examples 5 to 12 had a lower VHR and a higher ID than the liquid crystal display devices according to the present invention. Furthermore, occurrence of a residual image was observed in the burn-in evaluation, which was not at an acceptable level.

Comparative Examples 13 to 20

The comparative liquid crystal composition 4 or 5 shown in Table 38 was held between the substrates as in Example 1. Liquid crystal display devices of Comparative Examples 13-20 were each prepared using a specific one of the color filters 1 to 4 shown in Table 9. The VHR and ID of each liquid crystal display device were measured. Each liquid crystal display device was evaluated in terms of burn-in. Tables 39 and 40 summarize the results.

TABLE 38

| Name of compound | Content (%) |
|---|---|
| Comparative liquid crystal composition 4 | |
| 4-Cy-Cy-1d0 | 15 |
| 0d1-Cy-Cy-Ph-1 | 4 |
| 0d3-Cy-Cy-Ph-1 | 14 |
| 3-Cy-Ph—Ph-Cy-3 | 3 |
| 3-Cy-Ph—Ph1-Cy-3 | 4 |
| 1-Cy-Cy-Ph3—F | 9 |
| 2-Cy-Cy-Ph3—F | 10 |
| 3-Cy-Cy-Ph3—F | 10 |
| 5-Cy-Cy-Ph3—F | 5 |
| 3-Cy-Ph1—Ph3—F | 8 |
| 5-Cy-Ph1—Ph3—F | 7 |
| 3-Ph—Ph1—Ph3—F | 3 |
| 3-Cy-Cy-Ph1—Ph3—F | 8 |
| Tni/° C. | 101.0 |
| Δn | 0.095 |
| Δε | 8.2 |
| γ1/mPa · s | 115 |
| η/mPa · s | 23.6 |
| Comparative liquid crystal composition 5 | |
| 2-Cy-Cy-1d0 | 32 |
| 0d1-Cy-Cy-Ph-1 | 4 |
| 2-Ph—Ph1—Ph-3 | 10 |
| 2-Ph—Ph1—Ph-5 | 11 |
| 3-Ph—Ph1—Ph-5 | 7 |
| 2-Cy-Cy-Ph—F | 6 |
| 3-Cy-Cy-Ph—F | 21 |
| 5-Cy-Ph—Ph—F | 7 |
| 3-Cy-Ph—Ph3—F | 2 |
| Tni/° C. | 77.2 |
| Δn | 0.135 |
| Δε | 4.5 |
| γ1/mPa · s | 57 |
| η/mPa · s | 10.5 |

TABLE 39

| | Comparative example 13 | Comparative example 14 | Comparative example 15 | Comparative example 16 |
|---|---|---|---|---|
| Liquid crystal composition | Comparative liquid crystal composition 4 | Comparative liquid crystal composition 4 | Comparative liquid crystal composition 4 | Comparative liquid crystal composition 4 |
| Color filter | Color filter 1 | Color filter 2 | Color filter 3 | Color filter 4 |
| VHR | 98.4 | 98.3 | 98.0 | 97.9 |
| ID | 149 | 160 | 185 | 190 |
| Burn-in | Failure | Failure | Failure | Failure |

TABLE 40

| | Comparative example 17 | Comparative example 18 | Comparative example 19 | Comparative example 20 |
|---|---|---|---|---|
| Liquid crystal composition | Comparative liquid crystal composition 5 | Comparative liquid crystal composition 5 | Comparative liquid crystal composition 5 | Comparative liquid crystal composition 5 |
| Color filter | Color filter 1 | Color filter 2 | Color filter 3 | Color filter 4 |
| VHR | 98.5 | 98.4 | 98.2 | 98.1 |
| ID | 133 | 147 | 161 | 172 |
| Burn-in | Poor | Failure | Failure | Failure |

The liquid crystal display devices of Comparative Examples 13 to 20 had a lower VHR and a higher ID than the liquid crystal display devices according to the present invention. Furthermore, occurrence of a residual image was observed in the burn-in evaluation, which was not at an acceptable level.

Comparative Examples 21 to 32

A specific one of the comparative liquid crystal compositions 6 to 8 shown in Table 41 was held between the substrates as in Example 1. Liquid crystal display devices of Comparative Examples 21 to 32 were each prepared using a specific one of the color filters 1 to 4 shown in Table 9. The VHR and ID of each liquid crystal display device were measured. Each liquid crystal display device was evaluated in terms of burn-in. Tables 42 to 44 summarize the results.

TABLE 41

| Name of compound | Content (%) |
|---|---|
| Comparative liquid crystal composition 6 | |
| 4-Cy-Cy-1d0 | 18 |
| 3-Cy-Cy-4 | 15 |
| 0d1-Cy-Cy-Ph-1 | 8 |
| 2-Ph—Ph1—Ph-3 | 10 |
| 2-Ph—Ph1—Ph-5 | 6 |
| 3-Ph—Ph1—Ph-5 | 6 |
| 2-Cy-Cy-Ph—F | 6 |
| 3-Cy-Cy-Ph—F | 10 |
| 5-Cy-Ph—Ph—F | 7 |
| 3-Cy-Ph—Ph3—F | 14 |
| Tni/° C. | 73.5 |
| Δn | 0.126 |
| Δε | 4.9 |
| γ1/mPa·s | 94 |
| η/mPa·s | 16.9 |
| Comparative liquid crystal composition 7 | |
| 4-Cy-Cy-1d0 | 18 |
| 3-Cy-Cy-4 | 15 |
| 0d1-Cy-Cy-Ph-1 | 8 |
| 2-Ph—Ph1—Ph-3 | 10 |
| 2-Ph—Ph1—Ph-5 | 6 |
| 3-Ph—Ph1—Ph-5 | 5 |
| 2-Cy-Cy-Ph—F | 6 |
| 3-Cy-Cy-Ph—F | 5 |
| 5-Cy-Ph—Ph—F | 7 |
| 3-Cy-Ph—Ph3—F | 15 |
| 3-Cy-Cy-Ph1—Ph3—F | 5 |
| Tni/° C. | 75.7 |
| Δn | 0.125 |
| Δε | 5.5 |
| γ1/mPa·s | 103 |
| η/mPa·s | 18.4 |
| Comparative liquid crystal composition 8 | |
| 4-Cy-Cy-1d0 | 17 |
| 3-Cy-Cy-4 | 15 |
| 0d3-Cy-Cy-Ph-1 | 8 |
| 3-Cy-Ph—Ph-2 | 10 |
| 2-Ph—Ph1—Ph-5 | 7 |
| 3-Ph—Ph1—Ph-5 | 7 |
| 2-Cy-Cy-Ph—F | 6 |
| 3-Cy-Cy-Ph—F | 5 |
| 5-Cy-Ph-Ph—F | 7 |
| 3-Cy-Ph-Ph3—F | 14 |
| 3-Cy-Cy-Ph1—Ph3—F | 4 |
| Tni/° C. | 85.3 |
| Δn | 0.128 |
| Δε | 4.8 |
| γ1/mPa·s | 107 |
| η/mPa·s | 19.0 |

TABLE 42

| | Comparative example 21 | Comparative example 22 | Comparative example 23 | Comparative example 24 |
|---|---|---|---|---|
| Liquid crystal composition | Comparative liquid crystal composition 6 | Comparative liquid crystal composition 6 | Comparative liquid crystal composition 6 | Comparative liquid crystal composition 6 |
| Color filter | Color filter 1 | Color filter 2 | Color filter 3 | Color filter 4 |
| VHR | 98.3 | 98.2 | 98.0 | 97.9 |
| ID | 156 | 165 | 180 | 197 |
| Burn-in | Failure | Failure | Failure | Failure |

TABLE 43

| | Comparative example 25 | Comparative example 26 | Comparative example 27 | Comparative example 28 |
|---|---|---|---|---|
| Liquid crystal composition | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 |
| VHR | 98.4 | 98.2 | 98.0 | 98.0 |
| ID | 144 | 163 | 179 | 186 |
| Burn-in | Failure | Failure | Failure | Failure |

TABLE 44

| | Comparative example 29 | Comparative example 30 | Comparative example 31 | Comparative example 32 |
|---|---|---|---|---|
| Liquid crystal composition | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 |
| VHR | 98.5 | 98.3 | 98.2 | 97.9 |
| ID | 130 | 158 | 167 | 200 |
| Burn-in | Poor | Failure | Failure | Failure |

The liquid crystal display devices of Comparative Examples 21 to 32 had a lower VHR and a higher ID than the liquid crystal display devices according to the present invention. Furthermore, occurrence of a residual image was observed in the burn-in evaluation, which was not at an acceptable level.

Comparative Examples 33 to 44

A specific one of the comparative liquid crystal compositions 9 to 11 shown in Table 45 was held between the substrates as in Example 1. Liquid crystal display devices of Comparative Examples 33 to 44 were each prepared using a specific one of the color filters 1 to 4 shown in Table 9. The VHR and ID of each liquid crystal display device were measured. Each liquid crystal display device was evaluated in terms of burn-in. Tables 46 to 48 summarize the results.

TABLE 45

| Name of compound | Content (%) |
|---|---|
| Comparative liquid crystal composition 9 | |
| 2-Cy-Cy-Ph3—F | 10 |
| 0d1-Cy-Cy-Ph1—F | 8 |
| 2-Ph—Ph3— CFFO—Ph3—F | 4 |
| 3-Cy-Cy-Ph3—F | 10 |

TABLE 45-continued

| Name of compound | Content (%) |
|---|---|
| 2-Ph—Ph3—CFFO—Ph3—F | 6 |
| 3-Cy-Cy-Ph1—Ph3—F | 8 |
| 1-Cy-Cy-Ph3—F | 9 |
| 5-Cy-Cy-Ph3—F | 5 |
| 0d3-Ph-T-Ph-3d0 | 15 |
| 3-Cy-Ph-T-Ph-2 | 14 |
| 0d3-Ph—N—Ph-3d0 | 4 |
| 3-Ph—VO-Cy-VO—Ph-3 | 4 |
| 3-Cy-Cy-VO—Ph-Cy-3 | 3 |
| Tni/° C. | 101.6 |
| Δn | 0.153 |
| Δε | 9.2 |
| γ1/mPa · s | 101 |
| η/mPa · s | 23.7 |
| Comparative liquid crystal composition 10 | |
| 2-Cy-Cy-Ph3—F | 10 |
| 0d1-Cy-Cy-Ph1—F | 8 |
| 2-Ph—Ph3—CFFO—Ph3—F | 4 |
| 3-Cy-Cy-Ph3—F | 10 |
| 2-Ph—Ph3—CFFO—Ph3—F | 6 |
| 3-Cy-Cy-Ph1—Ph3—F | 8 |
| 1-Cy-Cy-Ph—3F | 9 |
| 5-Cy-Cy-Ph3—F | 5 |
| 0d3-Ph-T-Ph-3d0 | 10 |
| 3-Cy-Ph3-T-Ph9-1 | 4 |
| 4-Ph-T-Ph—O2 | 4 |
| 3-Cy-Ph-T-Ph-2 | 7 |
| 5-Cy-VO—Ph-1 | 5 |
| 3-Ph—VO-Cy-VO—Ph-3 | 7 |
| 3-Cy-Cy-VO—Ph-Cy-3 | 3 |
| Tni/° C. | 96.4 |
| Δn | 0.137 |
| Δε | 8.8 |
| γ1/mPa · s | 90 |
| η/mPa · s | 25.9 |
| Comparative liquid crystal composition 11 | |
| 2-Cy-Cy-Ph3—F | 10 |
| 0d1-Cy-Cy-Ph1—F | 8 |
| 3-Cy-Cy-Ph3—F | 10 |
| 2-Ph—Ph3—CFFO—Ph3—F | 6 |
| 3-Cy-Cy-Ph1—Ph3—F | 8 |
| 5-Cy-Cy-Ph3—F | 5 |
| 0d3-Ph-T-Ph-3d0 | 10 |
| 3-Cy-Ph3-T-Ph9-1 | 4 |
| 3-Cy-Cy-CFFO—Ph3—F | 4 |
| 4-Ph-T-Ph—O2 | 4 |
| 5-Cy-Cy-CFFO—Ph3—F | 9 |
| 5-Cy-VO—Ph-1 | 5 |
| 0d3-Ph—N—Ph-3d0 | 7 |
| 3-Ph—VO-Cy-VO—Ph-3 | 7 |
| 3-Cy-Cy-VO—Ph-Cy-3 | 3 |
| Tni/° C. | 99.2 |
| Δn | 0.136 |
| Δε | 7.8 |
| γ1/mPa · s | 105 |
| η/mPa · s | 26.6 |

TABLE 46

| | Comparative example 33 | Comparative example 34 | Comparative example 35 | Comparative example 36 |
|---|---|---|---|---|
| Liquid crystal composition | Comparative liquid crystal composition 9 | Comparative liquid crystal composition 9 | Comparative liquid crystal composition 9 | Comparative liquid crystal composition 9 |
| Color filter | Color filter 1 | Color filter 2 | Color filter 3 | Color filter 4 |
| VHR | 98.3 | 98.3 | 98.1 | 98.0 |
| ID | 151 | 154 | 178 | 188 |
| Burn-in | Failure | Failure | Failure | Failure |

TABLE 47

| | Comparative example 37 | Comparative example 38 | Comparative example 39 | Comparative example 40 |
|---|---|---|---|---|
| Liquid crystal composition | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 |
| VHR | 98.5 | 98.3 | 98.1 | 97.8 |
| ID | 129 | 156 | 169 | 203 |
| Burn-in | Failure | Failure | Failure | Failure |

TABLE 48

| | Comparative example 41 | Comparative example 42 | Comparative example 43 | Comparative example 44 |
|---|---|---|---|---|
| Liquid crystal composition | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 |
| VHR | 98.4 | 98.3 | 98.1 | 97.9 |
| ID | 145 | 160 | 172 | 195 |
| Burn-in | Poor | Failure | Failure | Failure |

The liquid crystal display devices of Comparative Examples 33 to 44 had a lower VHR and a higher ID than the liquid crystal display devices according to the present invention. Furthermore, occurrence of a residual image was observed in the burn-in evaluation, which was not at an acceptable level.

Comparative Examples 45 to 52

Liquid crystal display devices of Comparative Examples 45 to 52 were prepared as in Examples 5, 13, 17, 25, 37, 45, 61, and 65, respectively, except that the comparative color filter 1 shown in Table 9 was used instead of the color filter 1. The VHR and ID of each liquid crystal display device were measured. Each liquid crystal display device was evaluated in terms of burn-in. Tables 49 and 50 summarize the results.

TABLE 49

| | Comparative example 45 | Comparative example 46 | Comparative example 47 | Comparative example 48 |
|---|---|---|---|---|
| Liquid crystal composition | Liquid crystal composition 2 | Liquid crystal composition | Liquid crystal composition 4 | Liquid crystal composition 5 | Liquid crystal composition 7 |

TABLE 49-continued

|  | Comparative example 45 | Comparative example 46 | Comparative example 47 | Comparative example 48 |
|---|---|---|---|---|
| Color filter | Comparative color filter 1 | Comparative color filter 1 | Comparative color filter 1 | Comparative color filter 1 |
| VHR | 98.3 | 98.2 | 97.9 | 97.9 |
| ID | 162 | 180 | 193 | 192 |
| Burn-in | Failure | Failure | Failure | Failure |

TABLE 50

|  | Comparative example 49 | Comparative example 50 | Comparative example 51 | Comparative example 52 |
|---|---|---|---|---|
| Liquid crystal composition | Liquid crystal composition 10 | Liquid crystal composition 12 | Liquid crystal composition 16 | Liquid crystal composition 17 |
| Color filter | Comparative color filter 1 | Comparative color filter 1 | Comparative color filter 1 | Comparative color filter 1 |
| VHR | 98.2 | 98.0 | 97.9 | 97.7 |
| ID | 165 | 183 | 201 | 218 |
| Burn-in | Failure | Failure | Failure | Failure |

The liquid crystal display devices of Comparative Examples 45 to 52 had a lower VHR and a higher ID than the liquid crystal display devices according to the present invention. Furthermore, occurrence of a residual image was observed in the burn-in evaluation, which was not at an acceptable level.

The invention claimed is:

1. A liquid crystal display device comprising a first substrate; a second substrate; a liquid crystal composition layer held between the first substrate and the second substrate; a color filter including a black matrix and at least an RGB three-color pixel portion; a pixel electrode; and a common electrode,
wherein the liquid crystal composition layer is composed of a liquid crystal composition including one or more compounds represented by General Formula (I) and one or more compounds selected from the group consisting of compounds represented by General Formulae (II-b) to (II-f):

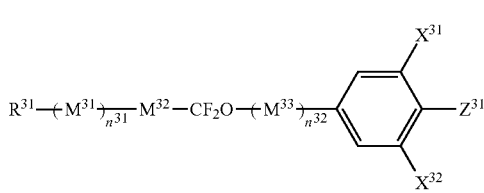

(I)

(where $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— groups of the trans-1,4-cyclohexylene group may be replaced with a —O— group such that oxygen atoms are not directly adjacent to one another, and one or two hydrogen atoms of the phenylene group may be replaced with a fluorine atom; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2, and $n^{31}+n^{32}$ is 0, 1, or 2; and, when a plurality of $M^{31}$'s or a plurality of $M^{33}$'s are present, they may be identical or different)

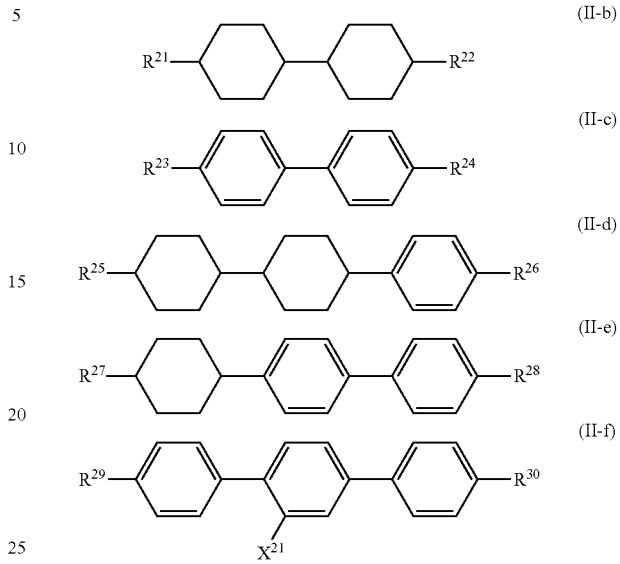

(where $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom), and
wherein the black matrix includes, as a coloring material, one or more pigments selected from carbon blacks, titanium blacks, and organic pigments, the one or more pigments having a volume resistivity of $10^6$ Ω·cm or more.

2. The liquid crystal display device according to claim 1, wherein the RGB three-color pixel portion includes an R pixel portion including C.I. Solvent Red 124 serving as a coloring material, a G pixel portion including a mixture of C.I. Solvent Blue 67 and C.I. Solvent Yellow 162, the mixture serving as a coloring material, and a B pixel portion including C.I. Solvent Blue 7 serving as a coloring material.

3. The liquid crystal display device according to claim 1, wherein the RGB three-color pixel portion includes an R pixel portion including C.I. Pigment Red 254 serving as a coloring material, a G pixel portion including C.I. Pigment Green 7 and/or C.I. Pigment Green 36 serving as a coloring material, and a B pixel portion including C.I. Pigment Blue 15:6 serving as a coloring material.

4. The liquid crystal display device according to claim 1, wherein the R pixel portion includes at least one organic dye or pigment selected from the group consisting of C.I. Pigment Red 177, C.I. Pigment Red 242, C.I. Pigment Red 166, C.I. Pigment Red 167, C.I. Pigment Red 179, C.I. Pigment Orange 38, C.I. Pigment Orange 71, C.I. Pigment Yellow 150, C.I. Pigment Yellow 215, C.I. Pigment Yellow 185, C.I. Pigment Yellow 138, C.I. Pigment Yellow 139, C.I. Solvent Red 89, C.I. Solvent Orange 56, C.I. Solvent Yellow 21, C.I. Solvent Yellow 82, C.I. Solvent Yellow 83:1, C.I. Solvent Yellow 33, and C.I. Solvent Yellow 162.

5. The liquid crystal display device according to claim 1, wherein the G pixel portion includes at least one organic dye or pigment selected from the group consisting of C.I. Pigment Yellow 150, C.I. Pigment Yellow 215, C.I. Pigment Yellow 185, C.I. Pigment Yellow 138, C.I. Solvent Yellow 21, C.I. Solvent Yellow 82, C.I. Solvent Yellow 83:1, and C.I. Solvent Yellow 33.

6. The liquid crystal display device according to claim 1, wherein the B pixel portion includes at least one organic dye or pigment selected from the group consisting of C.I. Pigment Blue 1, C.I. Pigment Violet 23, C.I. Basic Blue 7, C.I. Basic Violet 10, C.I. Acid Blue 1, C.I. Acid Blue 90, C.I. Acid Blue 83, and C.I. Direct Blue 86.

7. The liquid crystal display device according to claim 1, wherein the color filter further includes a Y pixel portion, wherein the Y pixel portion includes, as a coloring material, at least one yellow organic dye or pigment selected from the group consisting of C.I. Pigment Yellow 150, C.I. Pigment Yellow 215, C.I. Pigment Yellow 185, C.I. Pigment Yellow 138, C.I. Pigment Yellow 139, C.I. Solvent Yellow 21, C.I. Solvent Yellow 82, C.I. Solvent Yellow 83:1, C.I. Solvent Yellow 33, and C.I. Solvent Yellow 162.

8. The liquid crystal display device according to claim 1, wherein the compounds represented by General Formula (I) are compounds represented by General Formulae (I-a) to (I-f),

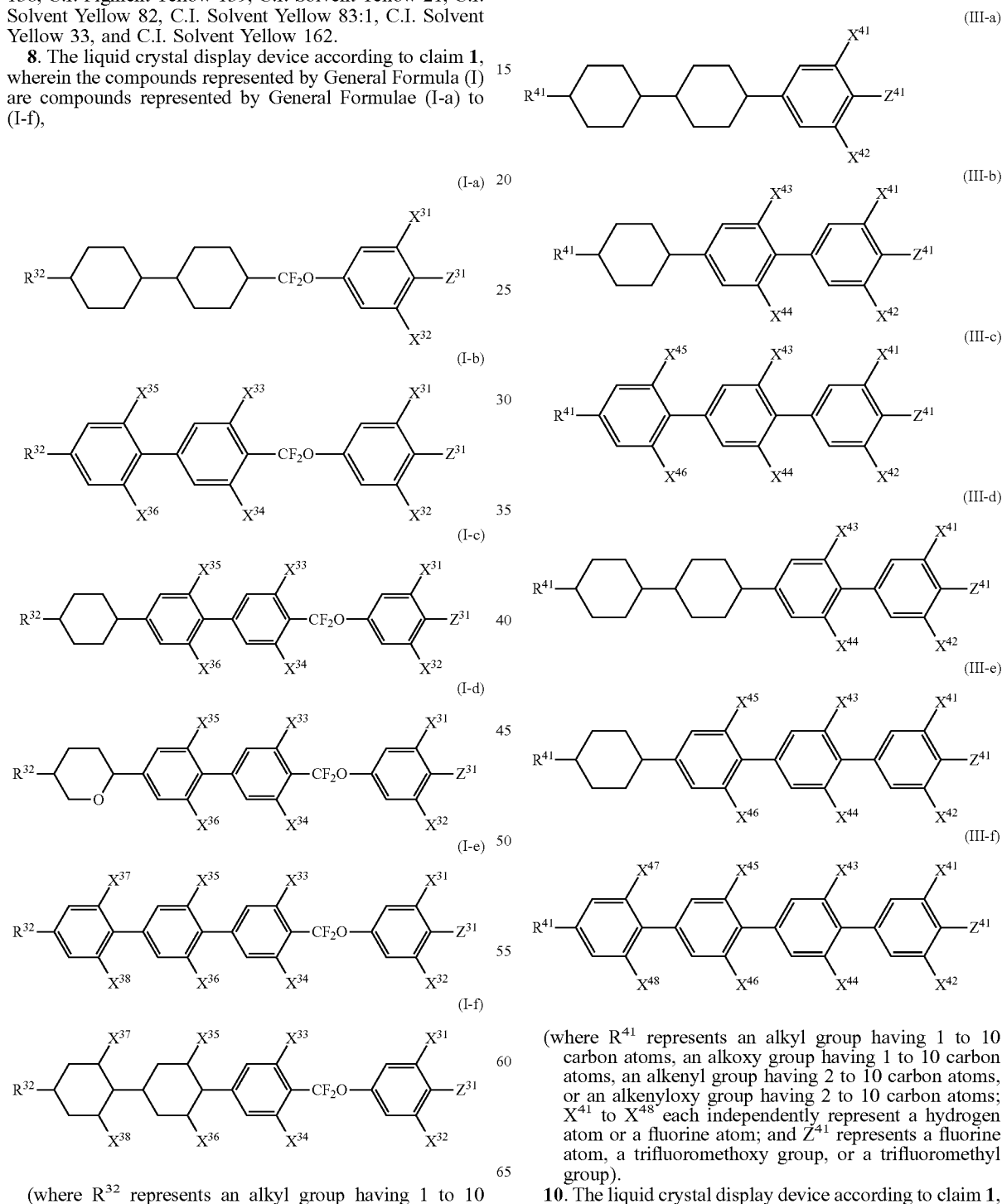

(where $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{31}$ to $X^{38}$ each independently represent a hydrogen atom or a fluorine atom; and $Z^{31}$ represents a fluorine atom, a trifluoromethoxy group, or a trifluoromethyl group).

9. The liquid crystal display device according to claim 1, wherein the liquid crystal composition layer further includes one or more compounds selected from the group consisting of compound represented by General Formulae (III-a) to (III-f), (where $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group).

10. The liquid crystal display device according to claim 1, wherein the liquid crystal composition layer is composed of a polymer formed by polymerizing a liquid crystal composition including one or more polymerizable compounds.

11. The liquid crystal display device according to claim 1, wherein the liquid crystal composition layer includes a difunctional monomer represented by General Formula (V),

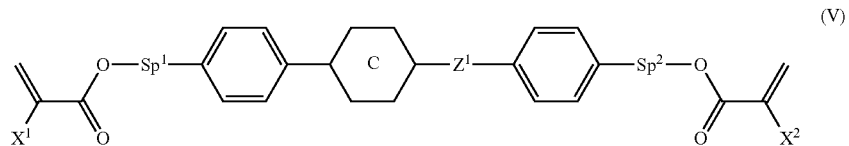

(V)

(where $X^1$ and $X^2$ each independently represent a hydrogen atom or a methyl group;

$Sp^1$ and $Sp^2$ each independently represent a single bond, an alkylene group having 1 to 8 carbon atoms, or —O—$(CH_2)_s$— (where s is an integer of 2 to 7 and the oxygen atom is bonded to an aromatic ring); $Z^1$ represents —OCH$_2$—, —CH$_2$O—, —OCO—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond; C represents a 1,4-phenylene group, a trans-1,4-cyclohexylene group, or a single bond; and, in all the 1,4-phenylene groups in General Formula (V), any hydrogen atom may be replaced with a fluorine atom).

\* \* \* \* \*